(12) United States Patent
Yoshimi et al.

(10) Patent No.: US 9,657,979 B2
(45) Date of Patent: May 23, 2017

(54) DEMAND-RESPONSE SYSTEM

(71) Applicant: DAIKIN INDUSTRIES, LTD., Osaka-shi, Osaka (JP)

(72) Inventors: Manabu Yoshimi, Sakai (JP); Takahiro Yamaguchi, Sakai (JP); Hiroei Mikami, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 14/894,477

(22) PCT Filed: May 13, 2014

(86) PCT No.: PCT/JP2014/062651
§ 371 (c)(1),
(2) Date: Nov. 27, 2015

(87) PCT Pub. No.: WO2014/192526
PCT Pub. Date: Dec. 4, 2014

(65) Prior Publication Data
US 2016/0123644 A1 May 5, 2016

(30) Foreign Application Priority Data
May 31, 2013 (JP) .................................. 2013-116408

(51) Int. Cl.
*G05D 23/32* (2006.01)
*F25B 39/04* (2006.01)
(Continued)

(52) U.S. Cl.
CPC .............. *F25B 49/02* (2013.01); *F25B 13/00* (2013.01); *G05B 15/02* (2013.01); *G06Q 50/06* (2013.01);
(Continued)

(58) Field of Classification Search
CPC ........... F24F 11/02; F25B 13/00; F25B 49/02; G06Q 50/06
(Continued)

(56) References Cited

U.S. PATENT DOCUMENTS 5,272,885 A * 12/1993 Watanabe ................. F24F 3/06
62/184
6,298,677 B1 * 10/2001 Bujak, Jr. ................. F24F 3/06
165/208

(Continued)

FOREIGN PATENT DOCUMENTS

| EP | 2763278 A1 | 8/2014 |
|---|---|---|
| JP | 2012-65407 A | 3/2012 |
| WO | 2013/047115 A1 | 4/2013 |

OTHER PUBLICATIONS

International Preliminary Report of corresponding PCT Application No. PCT/JP2014/062651 dated Dec. 1, 2015.
(Continued)

Primary Examiner — Henry Crenshaw
(74) Attorney, Agent, or Firm — Global IP Counselors, LLP

(57) ABSTRACT

A demand-response system includes first and second aggregators and a power aggregator. The first aggregator performs demand-response-related control of a first heating device group including a heat pump device, and the second aggregator performs demand-response related control of a second heating device group. The power aggregator sends a second power adjustment request to the first and second aggregators using a command being common to the first and second aggregators. In accordance with the second power adjustment request, the first aggregator performs demand-response-related control of the first heating device group using a first dedicated command, and the second aggregator performs demand-response-related control of the second heat-
(Continued)

ing device group using a second dedicated command that is different from the first dedicated command.

10 Claims, 11 Drawing Sheets

(51) Int. Cl.
| | | |
|---|---|---|
| G05D 23/00 | (2006.01) | |
| F25B 49/02 | (2006.01) | |
| G05B 15/02 | (2006.01) | |
| G06Q 50/06 | (2012.01) | |
| H02J 13/00 | (2006.01) | |
| F25B 13/00 | (2006.01) | |
| H02J 3/14 | (2006.01) | |
| F24F 11/02 | (2006.01) | |

(52) U.S. Cl.
CPC ............ *H02J 3/14* (2013.01); *H02J 13/0006* (2013.01); *F24F 11/02* (2013.01); *H02J 2003/143* (2013.01); *Y02B 70/3225* (2013.01); *Y02B 70/3266* (2013.01); *Y02B 70/3275* (2013.01); *Y04S 20/222* (2013.01); *Y04S 20/242* (2013.01); *Y04S 20/244* (2013.01)

(58) Field of Classification Search
USPC .................................................. 62/158, 184
See application file for complete search history.

(56) References Cited

U.S. PATENT DOCUMENTS

| | | | | |
|---|---|---|---|---|
| 2002/0043068 | A1* | 4/2002 | Carr ...................... | F24F 5/0017 62/3.7 |
| 2003/0182021 | A1* | 9/2003 | Kidder ............... | G05D 23/1934 700/277 |
| 2005/0033453 | A1* | 2/2005 | Coogan ................ | G05B 19/042 700/2 |
| 2005/0102068 | A1* | 5/2005 | Pimputkar ................ | H02J 3/14 700/291 |
| 2008/0000247 | A1* | 1/2008 | Sinha ........................ | F24H 4/04 62/238.7 |
| 2012/0065800 | A1 | 3/2012 | Baba et al. | |
| 2012/0298763 | A1* | 11/2012 | Young ................ | G05D 23/1905 236/51 |
| 2014/0217823 | A1 | 8/2014 | Baba et al. | |
| 2015/0028113 | A1* | 1/2015 | Day .................... | G05D 23/1904 236/51 |

OTHER PUBLICATIONS

International Search Report of corresponding PCT Application No. PCT/JP2014/062651 dated Jul. 15, 2014.
European Search Report of corresponding EP Application No. 14 80 4432,4 dated Dec. 23, 2016.

* cited by examiner

DEMAND-RESPONSE SYSTEM

CROSS-REFERENCE TO RELATED APPLICATIONS

This U.S. National stage application claims priority under 35 U.S.C. §119(a) to Japanese Patent Application No. 2013-116408, filed in Japan on May 31, 2013, the entire contents of which are hereby incorporated herein by reference.

TECHNICAL FIELD

The present invention relates to a demand-response system.

BACKGROUND ART

In the past, there have been known demand-response systems in which a power control apparatus controls the power usage of a plurality of devices owned by a plurality of power consumers, in accordance with requests to adjust power usage from a power supplier. For example, in the power control system disclosed in Japanese Laid-open Patent Application No. 2012-65407, a demand-response server controls the power usage of air conditioners and/or lighting devices installed in a plurality of buildings, in accordance with requests to adjust power usage of a power supplier.

To achieve accurate demand-response in a demand-response system such as that of Japanese Laid-open Patent Application No. 2012-65407, the demand-response server preferably controls power usage of devices using commands (control instructions) suitable for the control specifications of the devices. Especially, to achieve highly accurate demand-response, it is important to appropriately operate energy storage devices such as heat pump devices, and it is important to control the power usage of the energy storage devices using commands suitable for their control specifications.

SUMMARY

Technical Problem

In a demand-response system such as that of Japanese Laid-open Patent Application No. 2012-65407, the power consumers can use a wide variety of devices. Even in these cases, the demand-response server preferably controls the power usage of the devices using commands suitable for the control specifications of the devices. However, it is actually difficult for the demand-response server to prepare commands tailored to the control specifications of a wide variety of devices. Therefore, it is preferable that a standardized specification be designed for the devices, and that the devices be controlled by the demand-response server using a shared command developed according to the standardized specification.

However, considerable effort and cost are needed in order to design control specifications standardized for a wide variety of devices. To design standardized control specifications, the manufacturers of the devices are required to disclose the control specifications of the devices, but often it will be difficult for the device manufacturers to comply with these disclosures. In other words, it is an obstacle for device manufacturers to participate in a demand-response system that design of standardized control specifications and development of a shared command suitable for the control specifications are required.

An object of the present invention is to provide a demand-response system for controlling the power usage of devices, wherein highly accurate demand-response can be achieved without developing a shared command for controlling all of the devices.

Solution to Problem

A demand-response system according to a first aspect of the present invention is provided with a first aggregator apparatus, a second aggregator apparatus, and a first upper-tier aggregator apparatus. The first aggregator apparatus is configured to perform demand-response-related control of a first device group including a heat pump device. The second aggregator apparatus is configured to perform demand-response-related control of a second device group being different from the first device group. The first upper-tier aggregator apparatus is configured to send an energy adjustment request to the first aggregator apparatus and the second aggregator apparatus using a command being common to the first aggregator apparatus and the second aggregator apparatus. The first aggregator apparatus is configured to perform demand-response-related control of the first device group installed in a plurality of buildings using a first dedicated command for the first device group in accordance with the energy adjustment request. The second aggregator apparatus is configured to perform demand-response-related control of the second device group installed in a plurality of buildings using a second dedicated command for the second device group, which is different from the first dedicated command, in accordance with the energy adjustment request.

Because the first aggregator apparatus performs demand-response-related control of the first device group using the first dedicated command and the second aggregator apparatus performs demand-response-related control of the second device group using the dedicated command, the first upper-tier aggregator apparatus does not need to ascertain the control specifications of the first device group and the second device group. In other words, in the present demand-response system, highly accurate demand-response is possible even if the control specifications of the first device group and the second device group are not standardized and a command being common to all of the devices is not developed.

A demand-response system according to a second aspect of the present invention is the demand-response system according to the first aspect, wherein the demand-response-related control of the first device group includes control for storing heat in a heat reservoir in accordance with the energy adjustment request and/or control for releasing heat from the heat reservoir in accordance with the energy adjustment request. The heat reservoir herein may include, e.g., a medium (e.g., water and/or air) heated/cooled using the first heat pump devices.

Because the demand-response-related control of the first device group includes the control for storing heat in a heat reservoir and/or the control for releasing heat from the heat reservoir, the power usage of the first device group can be accurately controlled in accordance with the energy adjustment request of the first upper-tier aggregator apparatus. On the other hand, when the storing of heat in a heat reservoir and/or the releasing of heat from heat reservoir is controlled, more meticulous control is required than in cases such as when only the operating/stopping of the devices of the first device group is controlled. However, because the first aggregator apparatus performs demand-response-related control of the first device group using the first dedicated command, the first upper-tier aggregator apparatus does not need to ascertain the control specifications of each of the devices of the first device group. In other words, highly accurate demand-response is possible even if the first upper-tier aggregator apparatus does not ascertain the control specifications of the devices of the first device group.

A demand-response system according to a third aspect of the present invention is the demand-response system according to the second aspect, wherein the demand-response-related control of the first device group includes at least one of control for reducing the power usage of the first heat pump device, control for increasing the power usage of the first heat pump device, stop control for safely stopping the first heat pump devices, and start control for starting the first heat pump devices.

When the demand-response-related control of the first device group includes the control for increasing or reducing the power usage of the first heat pump device, the power usage of the first device group can be controlled more accurately in accordance with the energy adjustment request of the first upper-tier aggregator apparatus, relative to when only the operating/stopping of the first heat pump devices is controlled. In addition, when the demand-response-related control of the first device group includes the start control of the first heat pump devices, the control based on the starting characteristics of the heat pump devices is possible.

When the demand-response-related control includes such control of the first heat pump device, more meticulous control is required than in cases such as when simply the operating/stopping of the first heat pump device is controlled. However, because the first aggregator apparatus performs the demand-response-related control of the first device group, which includes the first heat pump device, using the first dedicated command, the first upper-tier aggregator apparatus does not need to ascertain the control specifications of the first heat pump device.

In other words, highly accurate and/or highly reliable demand-response is possible even if the first upper-tier aggregator apparatus does not ascertain the control specifications of the devices of the first device group.

A demand-response system according to a fourth aspect of the present invention is the demand-response system according to any of the first through third aspects, wherein the first upper-tier aggregator apparatus is configured to distribute a target adjustment amount of power usage to the first aggregator apparatus and the second aggregator apparatus, and send these distributed amounts as a first request amount and a second request amount, respectively, to the first aggregator apparatus and the second aggregator apparatus, together with the energy adjustment request. The first aggregator apparatus is configured to distribute the first request amount to individual devices in the first device group, and perform the demand-response-related control of the first device group based on the results of distributing the first request amount. The second aggregator apparatus is configured to distribute the second request amount to individual devices in the second device group, and perform the demand-response-related control of the second device group based on the results of distributing the second request amount.

Once the first upper-tier aggregator apparatus distributes the target adjustment amount of power usage to the first and second aggregator apparatuses, the adjustment amount of the power usage is distributed to the devices of the first device group and second device group by the first and second aggregator apparatuses. Therefore, the first upper-tier aggregator apparatus is required to ascertain the supply/demand adjustment characteristics of the first and second aggregator apparatuses, but is not required to ascertain the control specifications for the devices of the first device group and second device group. In other words, even if the first upper-tier aggregator apparatus herein does not ascertain the control specifications for the devices of the first device group and second device group, demand-response can be accurately achieved.

A demand-response system according to a fifth aspect of the present invention is the demand-response system according to the fourth aspect, is further provided with a second upper-tier aggregator apparatus. The second upper-tier aggregator apparatus is configured to send the target adjustment amount to the first upper-tier aggregator apparatus. The first device group includes solely a plurality of the first heat pump devices. The second device group includes solely a plurality of second heat pump devices. The first heat pump devices and the second heat pump devices are the same type of heat pump device.

The first upper-tier aggregator apparatus herein distributes the target adjustment amount to the first and second aggregator apparatuses controlling the same type of heat pump device. Therefore, the first upper-tier aggregator apparatus can distribute the target adjustment amount appropriately to the first and second aggregator apparatuses, based on the characteristics of this type of heat pump device. As a result, accurate demand-response is easily achieved.

A demand-response system according to a sixth aspect of the present invention is the demand-response system according to any of the first through fourth aspects, wherein the second device group includes devices for storing energy.

Because the second device group includes devices for storing energy (e.g., electricity and/or heat), the power usage of the second device group can be accurately controlled in accordance with the energy adjustment request of the first upper-tier aggregator apparatus.

A demand-response system according to a seventh aspect of the present invention is the demand-response system according to the sixth aspect, wherein the second device group includes device that have a storage battery.

Because the second device group includes the device that have a storage battery for accumulating electricity, the power usage of the second device group can be accurately controlled in accordance with the energy adjustment request of the first upper-tier aggregator apparatus.

Advantageous Effects of Invention

In the demand-response system according to the first aspect, because the first aggregator apparatus performs the demand-response-related control of the first device group using the first dedicated command and the second aggregator apparatus performs the demand-response-related control of the second device group using the second dedicated command, the first upper-tier aggregator apparatus does not need to ascertain the control specifications for the devices of the first device group and second device group. In other words, in the present demand-response system, highly accurate demand-response is possible even if the control specifications of the first device group and the second device group are not standardized and a command being common to all of the devices is not developed.

In the demand-response system according to the second aspect, highly accurate demand-response is possible even if the control specifications of the devices are not standardized and a command being common to all of the devices is not developed.

In the demand-response system according to the third aspect, highly accurate and/or highly reliable demand-response is possible even if the control specifications of the devices are not standardized and a command being common to all of the devices is not developed.

In the demand-response system according to the fourth aspect, demand-response can be accurately achieved even if the first upper-tier aggregator apparatus does not ascertain the control specifications for the devices of the first device group and second device group.

In the demand-response system according to the fifth aspect, accurate demand-response is easily achieved.

In the demand-response system according to the sixth and seventh aspects, the power usage of the second device group can be accurately controlled in accordance with the energy adjustment request of the first upper-tier aggregator apparatus.

BRIEF DESCRIPTION OF THE DRAWINGS

FIG. 12 does not depict the control of the room air-conditioner aggregator or apparatuses and devices being subordinate to the room air conditioner aggregator.

FIG. 14 does not depict the control of the second aggregator or of apparatuses and devices being subordinate to the second aggregator.

DESCRIPTION OF EMBODIMENTS

<First Embodiment>

A demand-response system 1A according to the first embodiment of the present invention is described with reference to the drawings. The following embodiment is an example and can be modified within a range that does not deviate from the scope of the invention.

(1) Overall Configuration

Figure 1:
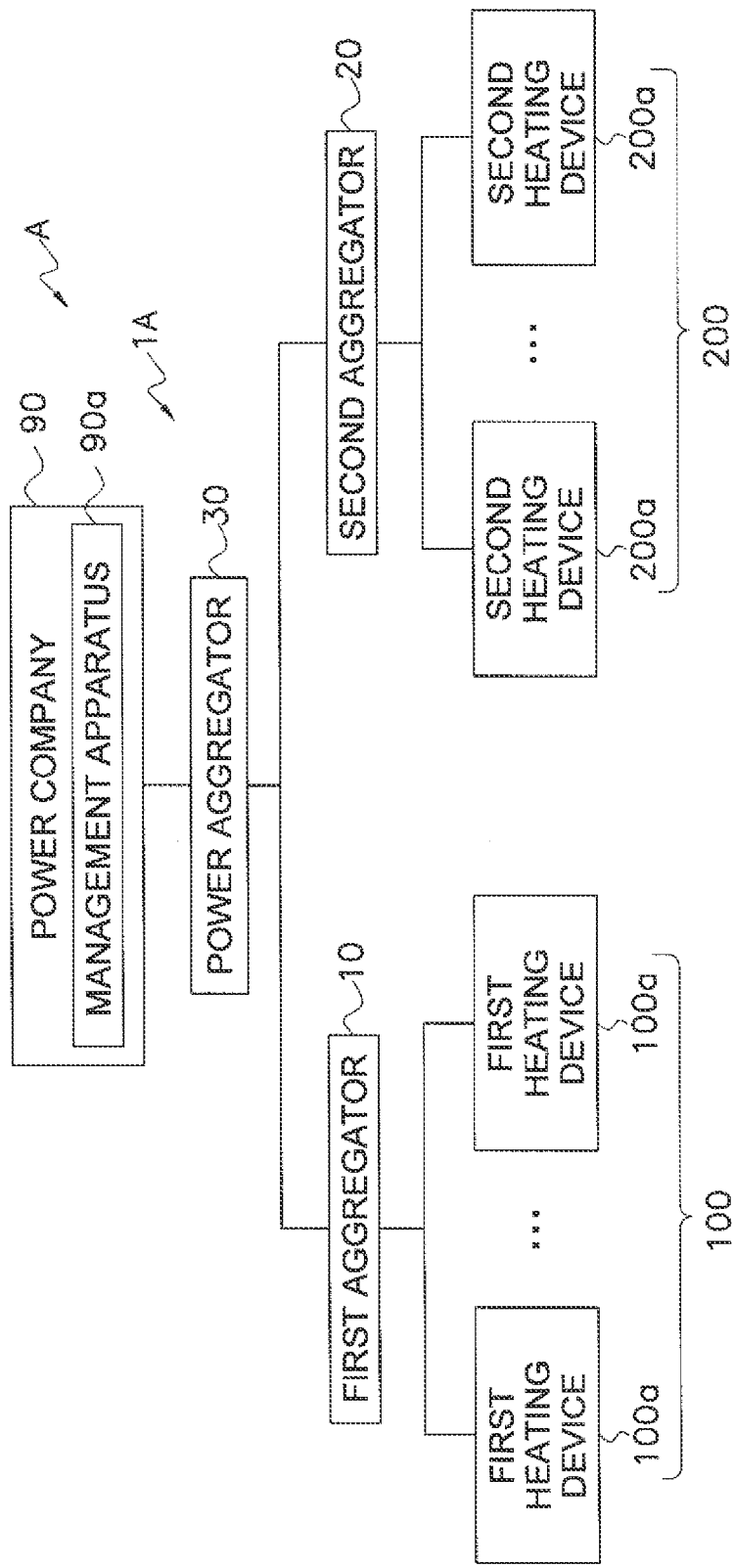
FIG. 1 is a schematic diagram of a power network including the demand-response system according to the first embodiment of the present invention.

FIG. 1 is a schematic diagram of a power network A including the demand-response system 1A. The power network A includes a power company 90, the demand-response system 1A, a first heating device group 100, and a second heating device group 200. The demand-response system 1A is provided with a power aggregator 30, a first aggregator 10, and a second aggregator 20. The first heating device group 100 is provided with a plurality of first heating devices 100a. The second heating device group 200 is provided with a plurality of second heating devices 200a.

The power company 90 supplies power to the first and second heating device groups 100, 200 owned by the power consumers. The power company 90 also supplies power to devices (not shown) that are owned by the power consumers and are not included in the first and second heating device groups 100, 200.

The power company 90 has a management apparatus 90a. The management apparatus 90a sends a power-usage adjustment request to the power aggregator 30 as needed, so that the power supply of the power company 90 and the power usage of the power consumers are balanced. The power-usage adjustment request sent by the management apparatus 90a to the power aggregator 30 will be referred as the first power adjustment request in the following. The first power adjustment request includes a suppression request requesting the power aggregator 30 to reduce the power usage and an advancement request requesting the power aggregator 30 to increase the power usage. When sending the first power adjustment request, the management apparatus 90a sends the power-usage adjustment request period and the target adjustment amount of power usage to the power aggregator 30. The power-usage adjustment request period is a period during which the management apparatus 90a requests the power aggregator 30 to reduce or increase the power usage. The target adjustment amount of power usage is an amount by which the management apparatus 90a requests the power aggregator 30 to reduce or increase the power usage.

The power aggregator 30 is one example of the first upper-tier aggregator apparatus. The power aggregator 30 is connected via communication lines to the management apparatus 90a of the power company 90 on the upper-tier side (see FIG. 1). The power aggregator 30 is also connected via communication lines to the first and second aggregators 10, 20 on the lower-tier side (see FIG. 1).

Upon receiving the first power adjustment request from the management apparatus 90a, the power aggregator 30, in order to comply with the request, sends a power-usage adjustment request to the first and second aggregators 10, 20. In other words, the power aggregator 30 sends a power-usage adjustment request to the first and second aggregators 10, 20 so that during the adjustment request period received from the management apparatus 90a, the total power usage adjusted by the first and second aggregators 10, 20 will reach the target adjustment amount received from the management apparatus 90a. The power-usage adjustment request sent by the power aggregator 30 to the first and second aggregators 10, 20 will be referred as the second power adjustment request in the following. The second power adjustment request is one example of the energy adjustment request.

The first aggregator 10 is one example of the first aggregator apparatus. The first aggregator 10 is connected to the power aggregator 30 on the upper-tier side via communication lines (see FIG. 1). The first aggregator 10 is also connected to the first heating devices 100a of the first heating device group 100 on the lower-tier side via communication lines (see FIG. 1).

The first aggregator 10 performs the demand-response-related control of the first heating device group 100 comprising the plurality of first heating devices 100*a*, in accordance with the second power adjustment request from the power aggregator 30. The term "demand-response-related control" of the first heating device group 100 means the control for adjusting the power usage of the first heating device group 100 so that the second power adjustment request from the power aggregator 30 is satisfied. It will be described hereinafter how the first heating devices 100*a* of the first heating device group 100 are controlled when the first aggregator 10 performs the demand-response-related control of the first heating device group 100.

The first heating devices 100*a* are devices used for indoor heating. The first heating devices 100*a* use a heat pump as a heat source, as is described hereinafter. The first heating devices 100*a* are one example of the first heat pump devices.

The first heating devices 100*a* are installed in a plurality of buildings. In other words, the first heating devices 100*a* are not all installed together in a single building, but are dispersed among a plurality of buildings. In this embodiment, the first heating devices 100*a* are installed in residences. The location of installation for the first heating devices 100*a* is merely one example, and the first heating devices 100*a* may be installed in buildings other than residences, such as, e.g., offices and/or commercial facilities. A single first heating device 100*a* may be installed in each building or a plurality of the first heating devices 100*a* may be installed in each building.

All of the first heating devices 100*a* belonging to the first heating device group 100 have identical control specifications. Features accompanied with the control specifications being identical among the first heating devices 100*a* include, for example, that a command used for giving a direction to the first heating devices 100*a* from the first aggregator 10 is common to all of the heating devices 100*a*. Features accompanied with the control specifications being identical among the first heating devices 100*a* also include, for example, that a communication protocol for conducting communication between the first heating devices 100*a* and the first aggregator 10 is identical for all of the first heating devices 100*a*. Features accompanied with the control specifications being identical among the first heating devices 100*a* also include that the control method for the first heating devices 100*a* (e.g., the control method at startup of the first heating devices 100*a*) is identical for all of the first heating devices 100*a*. Being identical as indicated above is not limited to being completely identical. For example, being identical may include cases in which some control specifications do not coincide in a section unless there are no particular obstacles for the first aggregator 10 controlling the first heating devices 100*a* using a shared command.

Specifically, all of the first heating devices 100*a* in the present embodiment are products manufactured by a certain manufacturer X1. The first aggregator 10 uses a first dedicated command for the first heating device group 100 (a dedicated command specific to the first heating devices 100*a* of manufacturer X1) in order to perform the demand-response-related control of the first heating device group 100. Communication between the first aggregator 10 and the first heating devices 100*a* is conducted using a communication protocol being unique to manufacturer X1, but the communication between the first aggregator 10 and the first heating devices 100*a* is not limited to such a scheme; a generic communication protocol may be employed.

The second aggregator 10 is one example of the second aggregator apparatus. The second aggregator 20 is connected to the power aggregator 30 on the upper-tier side via communication lines (see FIG. 1). The second aggregator 20 is also connected to the second heating devices 200*a* of the second heating device group 200 on the lower-tier side via communication lines (see FIG 1).

The second aggregator 20 performs the demand-response-related control of the second heating device group 200 comprising the plurality of second heating devices 200*a*, in accordance with the second power adjustment request from the power aggregator 30. The term "demand-response-related control" of the second heating device group 200 means the control for adjusting the power usage of the second heating device group 200 so that the second power adjustment request from the power aggregator 30 is satisfied.

The second heating devices 200*a* have the same configuration as the first heating devices 100*a*. In other words, the second heating devices 200*a* and the first heating devices 100*a* are the same type of heat pump device.

The second heating devices 200*a* are installed in a plurality of buildings. In other words, the second heating devices 200*a* are not all installed together in a single building, but are dispersed among a plurality of buildings, as with the first heating devices 100*a*. In this embodiment, the second heating devices 200*a* are installed in residences. This location of installation for the second heating devices 200*a* is merely one example, and the second heating devices 200*a* may be installed in buildings other than residences. A single second heating device 200*a* may be installed in each building or a plurality thereof may be installed in each building. The second heating devices 200*a* may be installed in the residences in which the first heating devices 100*a* are installed.

All of the second heating devices 200*a* belonging to the second heating device group 200 have identical control specifications. What is meant by the control specifications being identical is as described above, and is therefore not described here.

The second heating devices 200*a* in the present embodiment are products manufactured by a certain manufacturer X2 that is not manufacturer X1. The second aggregator 20 uses a second dedicated command for the second heating device group 200 (a dedicated command specific to the second heating devices 200*a* of manufacturer X2) in order to perform the demand-response-related control of the second heating device group 200. Communication between the second aggregator 20 and the second heating devices 200*a* is conducted using a communication protocol being unique to manufacturer X2, but the communication between the second aggregator 20 and the second heating devices 200*a* is not limited to such a scheme; a generic communication protocol may be employed.

The control specifications of the second heating devices 200*a* are not identical to the control specifications of the first heating devices 100*a*. In other words, the control specifications of the second heating devices 200*a* and the control specifications of the first heating devices 100*a* are not standardized. Therefore, the second dedicated command is different from the first dedicated command.

(2) Detailed Configuration

The power aggregator 30, the first aggregator 10, the second aggregator 20, the first heating devices 100*a*, and the second heating devices 200*a* are described below.

(2-1) Power Aggregator

The power aggregator 30 is one example of a first upper-tier aggregator apparatus for sending a second power adjustment request (an energy adjustment request) to the first and second aggregators 10, 20.

Figure 2:
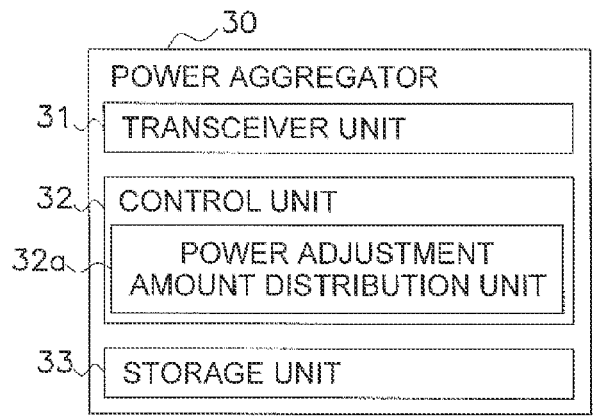
FIG. 2 is a block diagram of the power aggregator of the demand-response system of FIG. 1.

The power aggregator 30 has primarily a transceiver unit 31, a control unit 32, and a storage unit 33, as shown in FIG. 2.

(2-1-1) Transceiver Unit

The transceiver unit 31 is connected via communication lines to the management apparatus 90a of the power company 90 on the upper-tier side, as in FIG. 1. The transceiver unit 31 is also connected via communication lines to the first and second aggregators 10, 20 on the lower-tier side, as in FIG. 1. The transceiver unit 31 transfers a variety of information with the management apparatus 90a, the first aggregator 10, and the second aggregator 20.

Specifically, the transceiver unit 31 receives, e.g., the first power adjustment request (a power-usage adjustment request), along with the power-usage adjustment request period and the target adjustment amount of power usage, from the management apparatus 90a. The transceiver unit 31 receives, e.g., information pertaining to the power usage of the first heating device group 100 sent from the first aggregator 10, and information pertaining to the power usage of the second heating device group 200 sent from the second aggregator 20. The transceiver unit 31 sends to the management apparatus 90a, e.g., the total power usage of the first heating device group 100 and the. second heating device group 200 calculated by the control unit 32 described hereinafter. The transceiver unit 31 sends to the first aggregator 10, e.g., a first request amount calculated by a power adjustment amount distribution unit 32a described hereinafter, along with the second power adjustment request (an energy adjustment request). The transceiver unit 31 sends to the second aggregator 20, e.g., a second request amount calculated by a power adjustment amount distribution unit 32a described hereinafter, along with the second power adjustment request (an energy adjustment request).

When sending the second power adjustment request to the first and second aggregators 10, 20, the power aggregator 30 uses a command shared by the first and second aggregators 10, 20. An identical communication protocol is used for communication between the power aggregator 30 and the first and second aggregators 10, 20.

(2-1-2) Control Unit

The control unit 32 is mainly provided with a CPU. The control unit 32 executes a variety of processes by executing programs stored in the storage unit 33 described hereinafter. For example, the control unit 32 performs a variety of calculations based on the information received by the transceiver unit 31. The control unit 32, for example, writes information received by the transceiver unit 31, the results of the variety of calculations of the control unit 32, and/or the like into the storage unit 33, and reads information from the storage unit 33 as necessary.

Specifically, the control unit 32, for example, totals the power usage of the first heating device group 100 and the power usage of the second heating device group 200 received by the transceiver unit 31, and writes this total into the storage unit 33. The totals of the power usage of the first heating device group 100 and the power usage of the second heating device group 200 are stored as time-series data in the storage unit 33. The control unit 32 also reads the total of the power usage of the first heating device group 100 and the power usage of the second heating device group 200 from the storage unit 33, either periodically or upon request by the management apparatus 90a. The control unit 32 then directs the transceiver unit 31 to send the total of the power usage of the first heating device group 100 and the power usage of the second heating device group 200 to the management apparatus 90a.

Further, the control unit 32, for example, calculate levels of achievement in response to the second power adjustment request respectively for the first aggregator 10 and the second aggregator 20 by using the power usage of the first heating device group 100 and the power usage of the second heating device group 200 received by the transceiver unit 31. In other words, the control unit 32 calculates how well the first aggregator 10 and the second aggregator 20 were able to adjust their power usage respectively in response to the first request amount and the second request amount sent by the power aggregator 30. The calculated levels of achievement in response to the second power adjustment request are stored in the storage unit 33.

The control unit 32 has the power adjustment amount distribution unit 32a, described below, as a functional unit.

(2-1-2-1) Power Adjustment Amount Distribution Unit

The power adjustment amount distribution unit 32a distributes the target adjustment amount of power usage which the transceiver unit 31 has received from the management apparatus 90a to the first aggregator 10 and the second aggregator 20, and the distributed amounts are respectively calculated as a first request amount and a second request amount. The distribution of the target adjustment amount is described in detail.

As previously described, the transceiver unit 31 receives the power-usage adjustment request period and the target adjustment amount of power usage, along with the first power adjustment request, from the management apparatus 90a. Specifically, the transceiver unit 31 receives, e.g., information such as the adjustment request period being 6:00-7:00 pm and the target adjustment amount being 300 kW along with the first power adjustment request requesting a suppression of power usage. The power adjustment amount distribution unit 32a accordingly distributes the target adjustment amount received by the transceiver unit 31 to the first aggregator 10 and the second aggregator 20.

The power adjustment amount distribution unit 32a distributes the target adjustment amount to the first aggregator 10 and the second aggregator 20 based on, e.g., the variety of information stored in the storage unit 33 and/or the variety of information received by the transceiver unit 31, so as to have the highest possibility that the total adjusted amount of the power usage of the first heating device group 100 and the second heating device group 200 will reach the target adjustment amount. The variety of information stored in the storage unit 33 is, e.g., the maximum consumed power of the first heating device group 100 and the second heating device group 200 (i.e., the total maximum consumed power of the first heating devices 100a and the total maximum consumed power of the second heating devices 200a), time-series data of the power usage of the first heating device group 100 and the power usage of the second heating device group 200, and/or the levels of achievement of the first aggregator 10 and the second aggregator 20 in response to the second power adjustment request. The variety of information received by the transceiver unit 31 is, e.g., the current power usage of each of the first heating device group 100 and the second heating device group 200.

Specifically, the power adjustment amount distribution unit 32a distributes the target adjustment amount to the first aggregator 10 and the second aggregator 20 so that, e.g., the amounts distributed to the first heating device group 100 and the second heating device group 200 are proportional to the current power usage of the first heating device group 100 and the second heating device group 200, and the distributed amounts are calculated as the first request amount and the second request amount. The power adjustment amount distribution unit 32a may, e.g., correct the first request amount and the second request amount calculated as described above based on the levels of achievement of the first aggregator 10 and the second aggregator 20 in response to the second power adjustment request, so as to increase the ratio of distribution to the aggregator 10 or 20 that has the higher level of achievement.

The first request amount and the second request amount calculated by the power adjustment amount distribution unit 32a are sent via the transceiver unit 31 to the first aggregator 10 and the second aggregator 20, along with the power-usage adjustment request period and the second power adjustment request.

The distribution method of the target adjustment amount indicated here is merely one example and is not provided by way of limitation. There is no need for the power adjustment amount distribution unit 32a to calculate only one set of first and second request amounts in one adjustment request period, and multiple sets of first and second request amounts may be calculated during one adjustment request period. In other words, the power adjustment amount distribution unit 32a may fluctuate the ratio at which the target adjustment amount is distributed to the first aggregator 10 and the second aggregator 20 during one adjustment request period. When the ratio at which the target adjustment amount is distributed to the first aggregator 10 and the second aggregator 20 is fluctuated during the adjustment request period, multiple sets of first and second request amounts calculated by the power adjustment amount distribution unit 32a and the periods corresponding to the combinations of first and second request amounts are sent to the first aggregator 10 and the second aggregator 20.

(2-1-3) Storage Unit

The storage unit 33 is primarily provided with RAM, ROM, a hard disk, and the like. A variety of programs and/or a variety of information used by the control unit 32 are stored in the storage unit 33.

The storage unit 33 stores, e.g., information pertaining to the maximum consumed power of the first heating device group 100 and the second heating device group 200. The storage unit 33 also stores as time-series data, e.g., information pertaining to the power usage of the first heating device group 100 and the second heating device group 200 received by the transceiver unit 31, and the total of the power usage of the first heating device group 100 and the power usage of the second heating device group 200 as calculated by the control unit 32. The storage unit 33 also stores, e.g., the levels of achievement of the first aggregator 10 and the second aggregator 20 in response to the second power adjustment request, as calculated by the control unit 32.

(2-2) First Aggregator

The first aggregator 10 performs the demand-response-related control of the first heating device group 100 comprising the first heating devices 100a which uses a heat pump as a heat source. More specifically, the first aggregator 10 performs the demand-response-related control of the first heating device group 100 installed in a plurality of residences in response to a second power adjustment request from the power aggregator 30 with a first dedicated command for the first heating device group 100.

Figure 3:
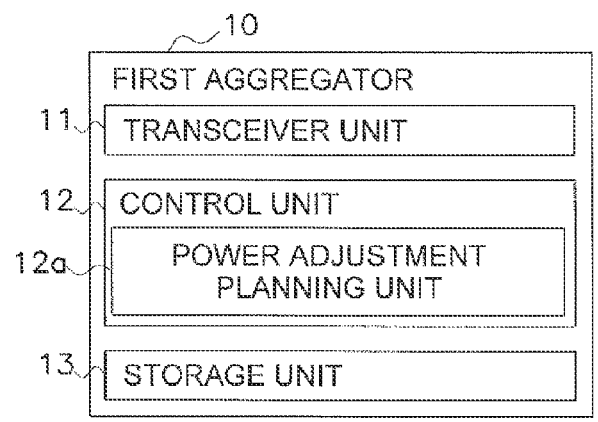
FIG. 3 is a block diagram of the first aggregator of the demand-response system of FIG. 1.

The first aggregator 10 has primarily a transceiver unit 11, a control unit 12, and a storage unit 13, as shown in FIG. 3.

(2-2-1) Transceiver Unit

The transceiver unit 11 is connected via communication lines to the power aggregator 30 on upper-tier side. The transceiver unit 11 is also connected via communication lines to the first heating devices 100a on the lower-tier side. The transceiver unit 11 transfers a variety of information with the power aggregator 30 and the first heating devices 100a.

Specifically, the transceiver unit 11 receives, e.g., the second power adjustment request (an energy adjustment request), along with the adjustment request period and the first request amount, from the power aggregator 30. The transceiver unit 11 receives, e.g., information pertaining to the power usage of the first heating devices 100a, sent from the first heating devices 100a. The transceiver unit 11 sends to the power aggregator 30, the total power usage of the first heating devices 100a calculated by the control unit 12 described hereinafter. The transceiver unit 11 sends, e.g., a control instruction generated by a power adjustment planning unit 12a of the control unit 12, described hereinafter, to the first heating devices 100a.

When sending the control instruction to each of the first heating devices 100a, the first aggregator 10 sends a control instruction to the first heating devices 100a using a first dedicated command for the first heating device group 100 (a dedicated command specific to the first heating devices 100a of manufacturer X1). Communication between the first aggregator 10 and the first heating devices 100a is conducted using a communication protocol unique to manufacturer X1 of the first heating devices 100a.

(2-2-2) Control Unit

The control unit 12 is primarily provided with a CPU. The control unit 12 executes a variety of processes by executing programs stored in the storage unit 13 described hereinafter. The control unit 12 performs a variety of calculations based on, e.g., the information received by the transceiver unit 11. The control unit 12 writes the information received by the transceiver unit 11, the results of the variety of calculations of the control unit 12, and or the like into the storage unit 13, and reads information from the storage unit 13 as necessary.

Specifically, the control unit 12, for example, totals the power usage of the first heating devices 100a received by the transceiver unit 11, and writes this total into the storage unit 13. The power usage of the first heating device group 100 is stored as time-series data in the storage unit 13. The control unit 12 also reads the power usage of the first heating device group 100 from the storage unit 13, either periodically or upon request by the power aggregator 30. The control unit 12 then directs the transceiver unit 11 to send the read power usage of the first heating device group 100 to the power aggregator 30.

Further the control unit 12, for example, calculate a level of achievement in power adjustment for each of the first heating devices 100a, by using the power usage of the first heating devices 100a received by the transceiver unit 11. The level of achievement in power adjustment is an indicator representing the level of achievement for how well each of the first heating devices 100a was actually able to adjust power usage, in response to the power adjustment amounts distributed to each of the first heating devices 100a by the power adjustment planning unit 12a, described hereinafter. The calculated levels of achievement in power adjustment for each of the first heating devices 100a are stored in the storage unit 13.

The control unit 12 has the power adjustment planning unit 12a, described below, as a functional unit.

(2-2-2-1) Power Adjustment Planning Unit

The power adjustment planning unit 12a distributes the first request amount received from the power aggregator 30 to the first heating devices 100a. The power adjustment planning unit 12a also performs the demand-response-related control of the first heating device group 100 based on the results of distributing the first request amount to the first heating devices 100a. In other words, the power adjustment planning unit 12a determines the control content for each of the first heating devices 100a based on the results of distribution of the first request amount, generates a control instruction for causing the first heating devices 100a to execute the control content, and sends the control instruction to the first heating devices 100a via the transceiver unit 11.

The distribution of the first request amount by the power adjustment planning unit 12a will be described in detail.

As previously described, the transceiver unit 11 of the first aggregator 10 receives the adjustment request period and the first request amount, along with the second power adjustment request, from the power aggregator 30. The power adjustment planning unit 12a then distributes the first request amount received by the transceiver unit 11 to the first heating devices 100a based on, e.g. the variety of information stored in the storage unit 13 and/or the variety of information received by the transceiver unit 11. The variety of information stored in the storage unit 13 is, e.g., the maximum consumed power of each of the first heating devices 100a, time-series data of the power usage of the each of the first heating devices 100a, and/or the levels of achievement in power adjustment of each of the first heating devices 100a calculated by the control unit 12. The variety of information received by the transceiver unit 11 is, e.g., the current power usage of each of the first heating devices 100a.

Specifically, the power adjustment planning unit 12a distributes the first request amount to the first heating devices 100a so that, e.g., the amounts distributed to the first heating devices 100a are proportional to the current respective power usage. The details are described using a specific example. For example, a case is considered in which a first request amount of 5 kW is suppressed by three first heating devices 100a. Assuming the current power usage of each of the first heating devices 100a are 10 kW, 10 kW, and 5 kW, respectively, the power adjustment planning unit 12a distributes 5 kW in proportion to the current respective power usage, and calculates the amounts distributed to the first heating devices 100a as 2 kW, 2kW, and 1 kW. The power adjustment planning unit 12a may also use the levels of achievement in power adjustment of each of the first heating devices 100a to correct the calculated amounts distributed to each of the first heating devices 100a.

The power adjustment planning unit 12a may distribute the first request amount to the first heating devices 100a so that the power usage is adjusted by the first request amount among all of the first heating devices 100a, by, e.g., dividing the adjustment request period into a plurality of periods, and reducing only the power usage of some of the first heating devices 100a in the divided adjustment request periods. The details are described using a specific example. For example, a case is considered in which a first request amount of 5 kW is suppressed by three first heating devices 100a during an adjustment request period of 30 min. In this case, the power adjustment planning unit 12a divides the adjustment request period into, e.g., three increments of ten minutes each, and distributes the entire 5 kW to one first heating device 100a throughout the divided periods.

The power adjustment planning unit 12a may, e.g., distribute the first request amount preferentially to a currently stopped first heating device 100a when the transceiver unit 11 receives a second power adjustment request requesting an increase in power usage.

The distribution methods of the first request amount indicated here are merely examples, and are not provided by way of limitation. The method of distributing the first request amount is preferably a distribution method capable of complying with the second power adjustment request from the power aggregator 30. In other words, the power adjustment planning unit 12a preferably distributes the first request amount to the first heating devices 100a so that the power usage is adjusted by the first request amount in the power-usage adjustment request period.

When the distributed amounts from the first request amount to the respective first heating devices 100a are determined, the power adjustment planning unit 12a determines the control content to be directed to each of the first heating devices 100a in order to achieve these amounts. In other words, the power adjustment planning unit 12a determines the content of the demand-response-related control of the first heating device group 100. Specific examples of the details of the control directed to the first heating devices 100a are described hereinafter.

Furthermore, the power adjustment planning unit 12a generates control instructions for causing each of the first heating devices 100a to execute the determined control content. The control instructions for each of the first heating devices 100a are sent to the first heating devices 100a via the transceiver unit 11.

(2-2-3) Storage Unit

The storage unit 13 is primarily provided with RAM, ROM, a hard disk, and the like. A variety of programs and/or a variety of information used by the control unit 12 are stored in the storage unit 13.

The storage unit 13 stores, e.g., information pertaining to the maximum consumed power of each of the first heating devices 100a. The storage unit 13 also stores as time series data, e.g., information pertaining to the power usage of each of the first heating devices 100a received by the transceiver unit 11, and the total power usage of the first heating devices 100a as calculated by the control unit 12. The storage unit 13 also stores, e.g., the levels of achievement in power adjustment of each of the first heating devices 100a as calculated by the control unit 12.

(2-3) Second Aggregator

The second aggregator 20 performs the demand-response-related control of the second heating device group 200 comprising the second heating devices 200a which uses a heat pump as a heat source. More specifically, the second aggregator 20 performs the demand-response-related control of the second heating device group 200 installed in a plurality of residences in response to the second power adjustment request of the power aggregator 30 with a second dedicated command for the second heating device group 200.

Figure 4:
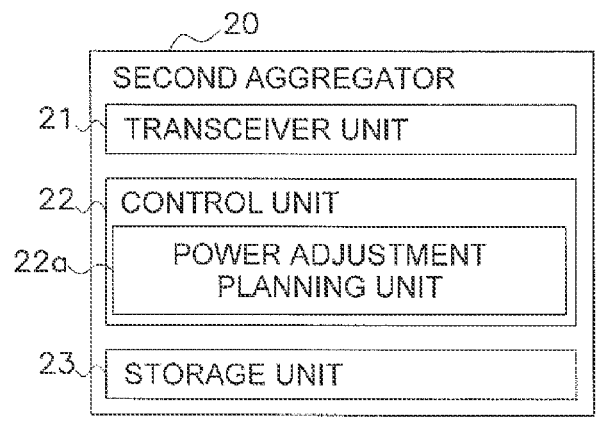
FIG. 4 is a block diagram of the second aggregator of the demand-response system of FIG. 1.

The second aggregator 20 has primarily a transceiver unit 21, a control unit 22, and a storage unit 23, as shown in FIG. 4. The control unit 22 has the power adjustment planning unit 22a as a functional unit.

The second aggregator 20 is similar to the first aggregator 20 except for the control objective of the demand-response-related control being different, and the second dedicated command (the dedicated command specific to the second heating devices 200a of manufacturer X2) for the second heating device group 200 for controlling the control objective being different from the first dedicated command for the first heating device group 100, and a description of the second aggregator is therefore omitted.

The second aggregator 20 and the first aggregator 10 being similar means that in the second aggregator 20 as well, the second request amount received by the transceiver unit 21 is distributed to each of the second heating devices 200a by the power adjustment planning unit 22a, and the power adjustment planning unit 22a determines the control content for each of the second heating devices 200a based on the results of distributing the second request amount, but the controls, process methods, and the like need not be identical. For example, the power adjustment planning unit 22a of the second aggregator 20 may distribute the second request amount to each of the second heating devices 200a using a different method than the power adjustment planning unit 12a of the first aggregator 10.

(2-4) First Heating Devices

The first heating devices 100a are devices that use heat pumps as heat sources, and are one example of the first heat pump devices. The first heating devices 100a are products manufactured by manufacturer X1.

Figure 5:
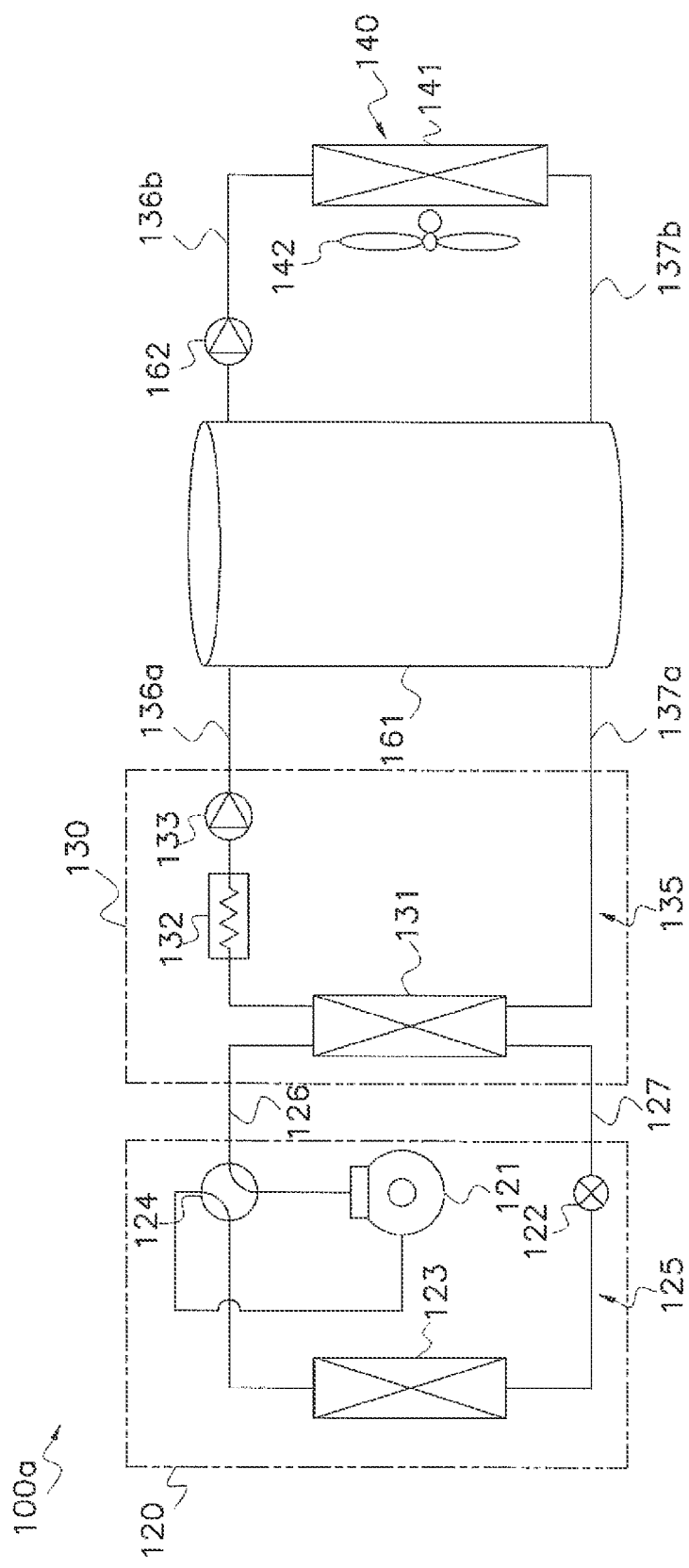
FIG. 5 is a schematic configuration drawing of the first heating device of FIG. 1.
Figure 6:
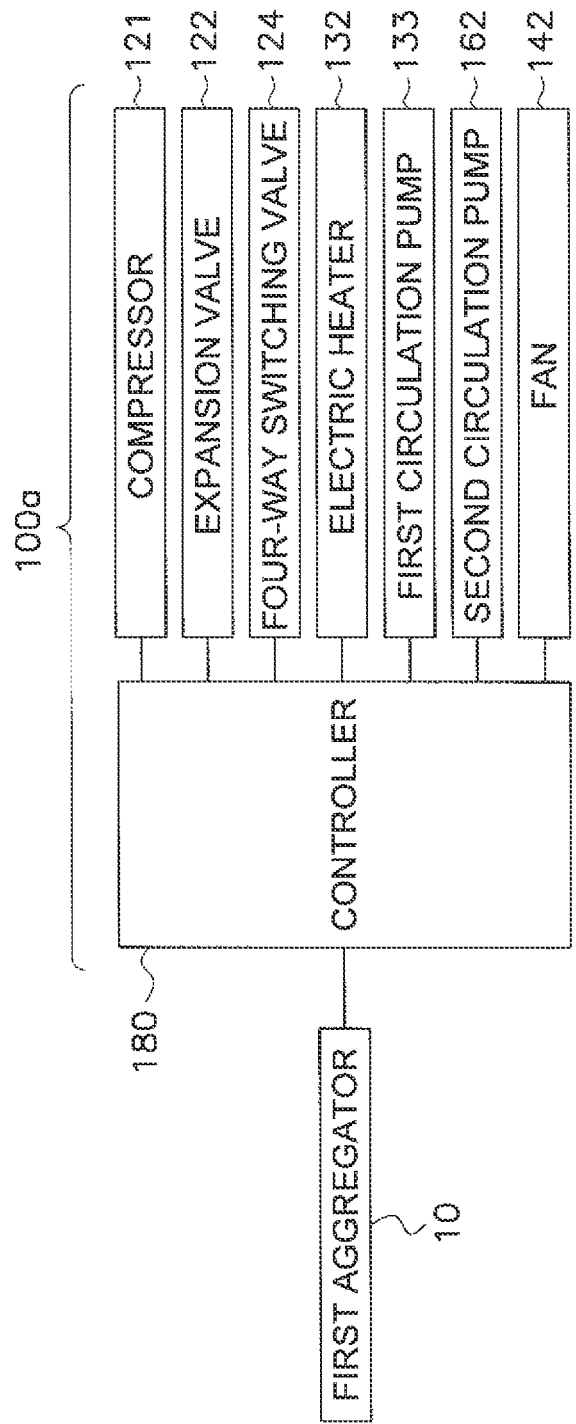
FIG. 6 is a block diagram of the first heating device of FIG. 5.

Each first heating device 100a has primarily an outdoor unit 120, an indoor unit 130, a heat storage tank 161, a second circulation pump 162, a heating unit 140, and a controller 180 (see FIGS. 5 and 6).

(2-4-1) Outdoor Unit

The outdoor unit 120 is normally installed outdoors. The outdoor unit is connected with the indoor unit 130 by a gas refrigerant communication tube 126 and a liquid refrigerant communication tube 127 as shown in FIG. 5. The outdoor unit constitutes a part of a refrigerant circuit 125.

The outdoor unit 120 has primarily a compressor 121, a four-way switching valve 124, a heat-source-side heat exchanger 123, and an expansion valve 122, as shown in FIG. 5.

The compressor 121 is a sealed compressor driven by a motor. The compressor 121 is inverter controlled. The compressor 121 draws low-pressure gas refrigerant in through an intake tube, the gas refrigerant is compressed by a compression mechanism in the compressor 121, and high-pressure gas refrigerant is discharged through a discharge tube.

The four-way switching valve 124 is a four-way switching valve for switching the direction of refrigerant flow. During an heating operation, the four-way switching valve 124 controls the direction of refrigerant flow by connecting the refrigerant tubes as shown in FIG. 5 so that the refrigerant compressed by the compressor 121 flows through the gas refrigerant communication tube 126 into a usage-side heat exchanger 131 of an indoor unit 130 described hereinafter, and low-pressure refrigerant flows from the heat-source-side heat exchanger 123 into the intake tube of the compressor 121.

The heat-source-side heat exchanger 123 conducts heat exchange between outdoor air and refrigerant flowing within the refrigerant circuit 125. The heat-source-side heat exchanger 123 functions as an evaporator of refrigerant flowing through the refrigerant circuit 125 during the heating operation.

The expansion valve 122 is an expansion mechanism for depressurizing refrigerant, and is an electric valve of which the opening degree can be adjusted.

(2-4-2) Indoor Unit

The indoor unit 130 is installed in a room. The indoor unit 130 is connected to the outdoor unit 120 via the gas refrigerant communication tube 126 and the liquid refrigerant communication tube 127 as shown in FIG. 5. The indoor unit 130 constitutes a part of the refrigerant circuit 125. The indoor unit 130 is also connected to the heating unit 140 via aqueous medium communication tubes 136a, 136b, 137a, 137b as shown in FIG. 5, constituting a part of an aqueous medium circuit 135.

The indoor unit 130 has primarily the usage-side heat exchanger 131, an electric heater 132, and a first circulation pump 133, as shown in FIG. 5.

The usage-side heat exchanger 131 is a heat exchanger for conducting heat exchange between the refrigerant flowing within the refrigerant circuit 125 and the aqueous medium flowing through the aqueous medium circuit 135. During the heating operation, the usage-side heat exchanger 131 functions as a condenser of refrigerant flowing through the refrigerant circuit 125, and heats the aqueous medium using a heat pump as a heat source.

The electric heater 132 is an electric heater for heating the aqueous medium flowing through the aqueous medium circuit 135.

The first circulation pump 133 is a centrifugal or positive displacement pump driven by a motor. The first circulation pump 133 is provided downstream of the electric heater 132. The first circulation pump 133 increases the pressure of the aqueous medium and causes the aqueous medium to circulate within the aqueous medium circuit 135. Specifically, the aqueous medium heated by the usage-side heat exchanger 131 or the electric heater 132 is increased in pressure by the first circulation pump 133 and sent to the heat storage tank 161 via the aqueous medium communication tube 136a.

(2-4-3) Heat Storage Tank

The heat storage tank 161 is provided within the aqueous medium circuit 135. Specifically, the heat storage tank 161 is connected with the indoor unit 130 via the aqueous medium communication tubes 136a, 137a, and is connected with the heating unit 140 via the aqueous medium communication tubes 136b, 137b.

The heat storage tank 161 is a tank for storing an aqueous medium. As will be described hereinafter, there are cases in which the first aggregator 10 controls the first heating device 100a so that the aqueous medium in the heat storage tank 161 is heated as a form of the demand-response-related control of the first heating device group 100, when the intention is to increase the power usage of the first heating device group 100. There are also cases in which the first aggregator 10 controls the first heating device 100a so that heating is performed using the aqueous medium in the heat storage tank 161 as a heat source without running the outdoor unit 120 and the electric heater 132 as a form of the demand-response-related control of the first heating device group 100, when the intention is to decrease the power usage of the first heating device group 100

(2-4-4) Second Circulation Pump

The second circulation pump 162 is a centrifugal or positive displacement pump driven by a motor. The second circulation pump 162 is provided to the aqueous medium communication tube 136b connecting the heat storage tank 161 and the heating unit 140. The second circulation pump 162 increases the pressure of the aqueous medium and causes the aqueous medium to circulate within the aqueous medium circuit 135. Specifically, the second circulation pump 162 increases the pressure of the aqueous medium within the heat storage tank 161 and sends the aqueous medium through the aqueous medium communication tube 136b to a heat exchanger 141 of the heating unit 140, described hereinafter.

(2-4-5) Heating Unit

The heating unit 140 performs heating of the room interior using the aqueous medium fed from the heat storage tank 161 by the second circulation pump 162. The heating unit 140 is installed in the space to be heated. The heating unit 140 is connected to the indoor unit 130 via the aqueous medium communication tubes 136a, 136b, 137a, 137b as shown in FIG. 5, constituting part of the aqueous medium circuit 135.

The heating unit 140 is a fan coil unit having primarily a heat exchanger 141 and a fan 142, as shown in FIG. 5. The heat exchanger 141 and the fan 142 are accommodated in a casing (not shown).

The heat exchanger 141 functions as a heater of indoor air by conducting heat exchange between indoor air and the aqueous medium fed from the heat storage tank 161 by the second circulation pump 162.

The fan 142 takes air into the casing (not shown) and promotes heat exchange between the aqueous medium and the indoor air in the heat exchanger 141. The indoor air heated by the heat exchanger 141 is blown out of the casing (into the room).

(2-4-6) Controller

The controller 180 is provided for controlling the first heating device 100a. The controller 180 is a microcomputer having a CPU and RAM, ROM, a hard disk, or other memory. The controller 180 performs a variety of controls on the first heating device 100a due to the CPU executing a variety of programs stored in memory or the like.

The controller 180 is connected to the first aggregator 10 on the upper-tier side via communication lines, as shown in FIG. 6. The controller 180 transfers a variety of information with the first aggregator 10. Specifically, the controller 180 receives, e.g., control instructions from the first aggregator 10. The controller 180 also sends, e.g., the power usage of the first heating device 100a to the first aggregator 10, either periodically or upon request by the first aggregator 10.

The controller 180 is electrically connected primarily to the compressor 121, the expansion valve 122, the four-way switching valve 124, the electric heater 132, the first circulation pump 133, the second circulation pump 162, and the fan 142 of the first heating device 100a, as shown in FIG. 6. The controller 180 also receives detection signals from a variety of sensors (temperature sensors and the like, not shown) provided to the first heating device 100a.

When the controller 180 has not received a control instruction from the first aggregator 10, the controller 180 controls the first heating device 100a based on a user's directive (operate/stop the first heating device 100a, set heating temperature, etc.) received by a remote controller (not shown), detection signals of a variety of sensors provided to the first heating device 100a, and/or the like.

When the controller 180 has received a control instruction from the first aggregator 10, the controller 180 controls the first heating device 100a based on the received control instruction. A specific example of a control instruction the controller 180 receives from the first aggregator 10 is described hereinafter.

(2-5) Second Heating Devices

The second heating devices 200a are devices that use heat pumps as heat sources.

The second heating devices 200a are products manufactured by manufacturer X2, which is different from manufacturer X1 of the first heating devices 100a. The control specifications of the second heating devices 200a are unique to manufacturer X2 and are different from the control specifications of the first heating devices 100a. Specifically, there is a difference between at least the command used by the second aggregator 20 to control the second heating devices 200a and the command used by the first aggregator 10 to control the first heating devices 100a.

Except for the control specifications, the second heating devices 200a and the first heating devices 100a are similar. For example, each second heating device 200a has similar configuration as the configuration of the first heating device 100a shown in FIGS. 5 and 6. Therefore, a description of the second heating device 200a is omitted.

(3) Heating Operation by First Heating Device

An outline of the heating operation by the first heating device 100a is described below.

The heating operation of the second heating device 200a is different in detail (for example, the details of start control performed when the heating device is started, or more specifically, control performed when the compressor is started, control timing of the expansion valve, etc.) from the heating operation of the first heating device 100a but roughly the same overall, and a description is therefore omitted here.

The heating operation of the first heating device 100a is performed when the user of the first heating device 100a uses a remote controller (not shown) to request operation of the first heating device 100a. The rotational speed of the compressor 121, the opening degree of the expansion valve 122, and other parameters, as well as the operation/stopping of the electric heater 132, are determined by the controller 180 based on the set temperature inputted by the user via the remote controller (not shown), the indoor temperature acquired by a sensor (not shown), and/or other factors.

The first heating device 100a performs heating essentially by heating the aqueous medium in the aqueous medium circuit 135 using a vapor-compression heat pump cycle, and conducting heat exchange between the heated aqueous medium and the indoor air.

Specifically, in the heating operation, normally the outdoor unit 120 is operated (the compressor 121 is operated) and refrigerant circulates within the refrigerant circuit 125. In the usage-side heat exchanger 131, heat exchange is conducted between the refrigerant of the refrigerant circuit 125 and the aqueous medium of the aqueous medium circuit 135, and the aqueous medium is heated. In the heating operation, normally the first circulation pump 133 and the second circulation pump 162, described hereinafter, are operated. The aqueous medium heated by the usage-side heat exchanger 131 is increased in pressure by the first circulation pump 133, and the aqueous medium flows trough the aqueous medium communication tube 136a into the heat storage tank 161. Furthermore, the aqueous medium in the heat storage tank 161 is increased in pressure by the second circulation pump 162, and the aqueous medium flows through the aqueous medium communication tube 136b into the heat exchanger 141. In the heat exchanger 141, heat exchange takes place between the aqueous medium flowing through the aqueous medium circuit 135 and the indoor air, and the warmed air is blown out into the room by the fan 142. Thus, heating of the room interior is performed. The aqueous medium that has passed through the heat exchanger 141 flows through the aqueous medium communication tube 137b into the heat storage tank 161. Furthermore, the aqueous medium of the heat storage tank 161 returns to the indoor unit 130 through the aqueous medium communication tube 137a.

The heating capability of the first heating device 100a is adjusted by controlling, e.g., the rotational speed of the compressor 121. When the heat quantity that can be supplied using the heat pump is less than the heating capability required by the heating unit 140, the outdoor unit 120 is operated and the electric heater 132 is turned on, for enabling operation of the first heating device 100*a*.

When the heating operation is performed using the heat pump as a heat source while the outdoor air temperature is extremely low, frost forms on the surface of the heat-source-side heat exchanger 123. Therefore, the outdoor unit 120 performs a defrosting operation as appropriate. During this time in the first heating device 100*a*, the electric heater 132 is turned on for enabling operation.

(4) Control Content of First Heating Device Determined by First Aggregator

There follows a description of the control contents of the first heating device 100*a* determined by the first aggregator 10, i.e., the control contents of the first heating device 100*a* determined by the power adjustment planning unit 12*a*. Because control contents of the second heating device 200*a* determined by the second aggregator 20 are similar to the control contents of the first heating device 100*a* determined by the first aggregator 10, a description thereof is not provided.

To say that the control contents of the second heating device 200*a* determined by the second aggregator 20 are similar to the control contents of the first heating device 100*a* determined by the first aggregator 10 does not necessarily mean that the control contents of both aggregators 10, 20 completely coincide. For example, some of the control contents of the second heating device 200*a* determined by the second aggregator 20 need not be included in the control contents of the first heating device 100*a* determined by the first aggregator 10.

The control of the first heating device 100*a* determined by the first aggregator 10 is control for increasing or reducing the power usage of the first heating device 100*a*. The control contents of the first heating device 100*a* determined by the first aggregator 10 are described below using a specific example. The control contents of the first heating device 100*a* determined by the first aggregator 10 need not include all of the control contents indicated below.

For example, the control for increasing the power usage of the first heating device 100*a* includes control for increasing the rotational speed of the operating compressor 121. For example, the control. for increasing the power usage of the first heating device 100*a* includes start control of the first heating device 100*a*, in which the stopped first heating device 100*a* is started without an instruction to operate the first heating device 100*a* having been inputted to the remote controller (not shown). For example, the control for increasing the power usage of the first heating device 100*a* includes control for turning on the electric heater 132 which had been off. For example, the control for increasing the power usage of the first heating device 100*a* includes control for running the first heating device 100*a* and increasing the stored heat quantity of the heat reservoir. The control for increasing the stored heat quantity of the heat reservoir includes, e.g., control for raising the temperature of the aqueous medium in the heat storage tank 161. The control for raising the temperature of the aqueous medium in the heat storage tank 161 includes, e.g., control for operating the outdoor unit 120 and the first circulation pump 133 while the second circulation pump 162 is stopped. The control for increasing the stored heat quantity of the heat reservoir also includes, e.g., control for heating the air in the room, and particularly control for heating the air to an extent that is unnecessary for the heating operation. The control for heating the air to an extent that is unnecessary for the heating operation includes control for further heating the indoor air, e.g., when there is no instruction to operate the first heating device 100*a* from the remote controller (not shown), and/or when the indoor temperature exceeds the heating set temperature. The control for increasing the stored heat quantity of the heat reservoir also includes, e.g., control for raising the temperature of the refrigerant of the refrigerant circuit 125, and particularly control for raising the temperature of the refrigerant to an extent that is unnecessary for the heating operation.

For example, the control for reducing the power usage of the first heating device 100*a* includes control for reducing the rotational speed of the operating compressor 121. For example, the control for reducing the power usage of the first heating device 100*a* includes stop control for safely stopping the operating first heating device 100*a*. For example, the control for reducing the power usage of the first heating device 100*a* includes control for turning off the electric heater 132 which had been on. For example, the control for reducing the power usage of the first heating device 100*a* includes control for reducing the stored heat quantity of the heat reservoir by radiating heat from the heat reservoir. The control for reducing the stored heat quantity of the heat reservoir includes, e.g., control for lowering the temperature of the aqueous medium in the heat storage tank 161. The control for lowering the temperature of the aqueous medium in the heat storage tank 161 includes, e.g., control for operating the second circulation pump 162 to perform heating while the outdoor unit 120 and the first circulation pump 133 are stopped.

When the controller 180 receives a control instruction such as that described above from the first aggregator 10, the controller 180 executes that control instruction in preference to control for a normal heating operation. For example, when the controller 180 receives a control instruction to increase or reduce the rotational speed of the compressor 121 during the heating operation, the controller 180 operates the compressor 121 using the rotational speed of the compressor 121 received as the control instruction instead of the rotational speed of the compressor 121 determined based on the operating conditions (the heating set temperature, the indoor temperature, and/or other conditions). For example, when the controller 180 receives a control instruction to stop the first heating device 100*a* during the heating operation, the controller 180 performs stop control for stopping the first heating device 100*a* even if the user has given a directive to operate the first heating device 100*a* via the remote controller. For example, when the controller 180 receives a control instruction to operate the first heating device 100*a* when the heating operation is stopped, the controller performs start control of the first heating device 100*a* for starting the operation of the first heating device 100*a*, even if the user has given a directive to stop the first heating device 100*a* via the remote controller.

(5) Power Usage Adjustment Control by Demand-Response System

Figure 7:
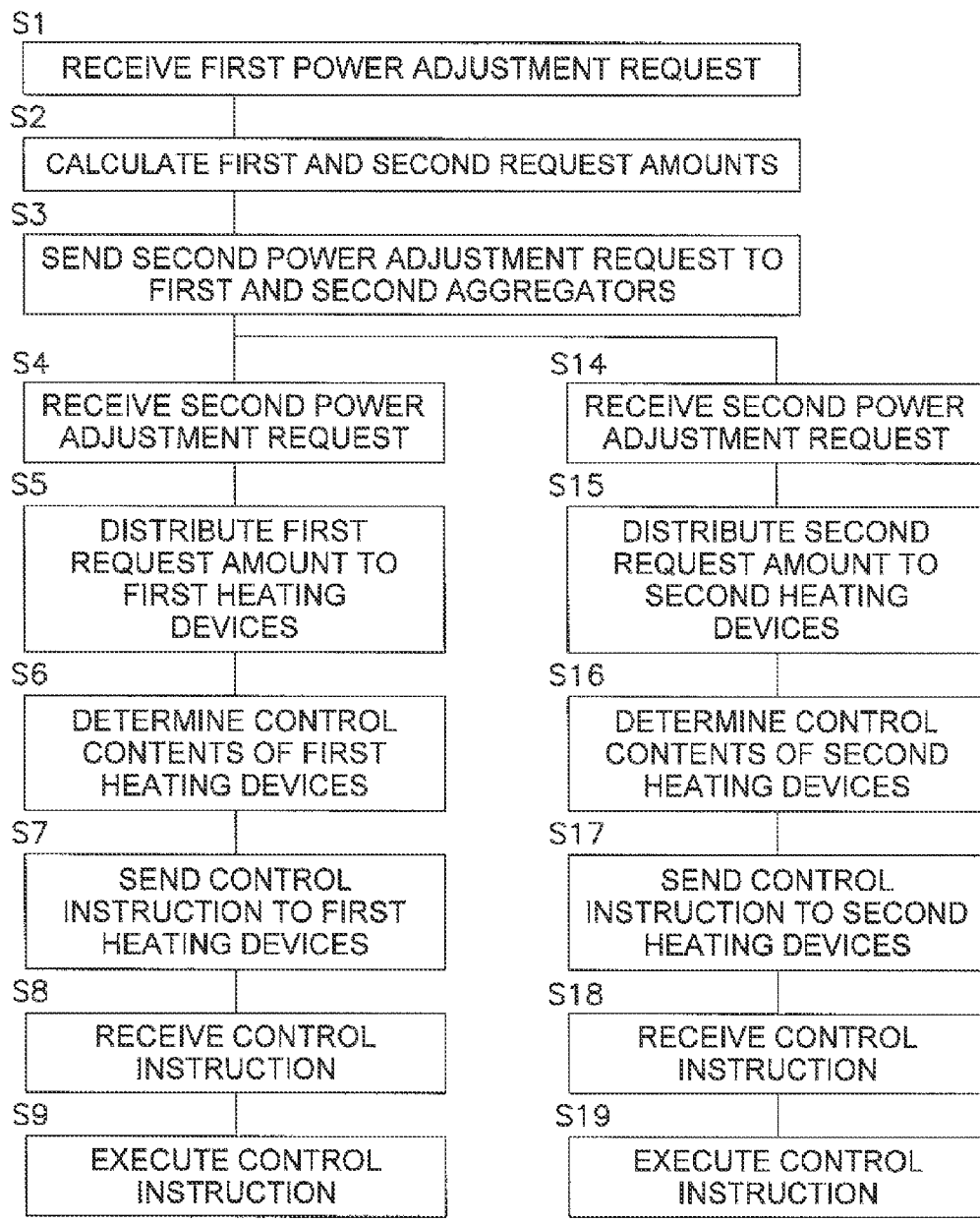
FIG. 7 is a flowchart for describing the power consumption adjustment control in the demand-response system of FIG. 1.

The flowchart of FIG. 7 is used to describe power usage adjustment control of the first heating device group 100 and the second heating device group 200 performed by the demand-response system 1A when a first power adjustment request has been sent from the management apparatus 90*a* to the power aggregator 30.

In step S1, the power aggregator 30 receives the first power adjustment request, the power-usage adjustment request period, and the target adjustment amount of power usage sent by the management apparatus 90*a*. The sequence then advances to step S2.

In step S2, the power aggregator 30 distributes the target adjustment amount of power usage received from the management apparatus 90a to the first aggregator 10 and the second aggregator 20, and calculates the distributed amounts as the first request amount and the second request amount, respectively. Specifically, the power aggregator 30 distributes the target adjustment amount to the first aggregator 10 and the second aggregator 20 and calculates the distributed amounts as the first request amount and the second request amount so that, e.g., the amounts distributed to the first heating device group 100 and the second heating device group 200 are proportional to the current power usage of the first heating device group 100 and the second heating device group 200. After the first request amount and the second request amount are calculated, the sequence advances to step S3.

In step S3, the power aggregator 30 sends the calculated first request amount and power-usage adjustment request period to the first aggregator 10 together with the second power adjustment request. In addition, the power aggregator 30 sends the calculated second request amount and power-usage adjustment request period to the second aggregator 20 together with the second power adjustment request. The power aggregator 30 sends the second power adjustment request, etc. to the first and second aggregators 10, 20 using a command that is common to the first and second aggregators 10, 20. The sequence then advances to step S4 and step S14.

Steps S4 to S9 are executed by the first aggregator 10, and the first heating device group 100 controlled by the first aggregator 10. Steps S14 to S19 are executed by the second aggregator 20, and the second heating device group 200 controlled by the second aggregator 20. Steps S4 to S9 are executed in parallel with step S14 to S19.

In step S4, the first aggregator 10 receives the second power adjustment request, the power-usage adjustment request period, and the first request amount sent by the power aggregator 30. The sequence then advances to step S5.

In step S5, the first aggregator 10 distributes the first request amount received from the power aggregator 30 to the first heating devices 100a. Specifically, the first aggregator 10 distributes the first request amount to the first heating devices 100a so that the amounts distributed to the first heating devices 100a are proportional to the current power usage of the respective first heating devices 100a. The sequence then advances to step S6.

In step S6, the first aggregator 10 determines the control contents so that the respective power consumptions of the first heating devices 100a can be adjusted by the amounts distributed to the respective first heating devices 100a. The control of a first heating device 100a determined by the first aggregator 10 includes, e.g., control for storing heat in the aqueous medium in the heat storage tank 161 (control for raising the temperature of the aqueous medium in the heat storage tank 161), and/or control for releasing the heat from the aqueous medium in the heat storage tank 161 (control for lowering the temperature of the aqueous medium in the heat storage tank 161), as described above. The control of a first heating device 100a determined by the first aggregator 10 includes increasing or reducing the power usage by, e.g., increasing or reducing the rotational speed of the compressor 121, as described above. The control of a first heating device 100a determined by the first aggregator 10 also includes, e.g., start control for starting the first heating device 100a which had been stopped, and/or stop control for safely stopping the first heating device 100a which had been operating, as described above. When the first aggregator 10 determines the control contents of the first heating devices 100a, the first aggregator generates control instructions for causing the respective first heating devices 100a to execute the control contents. The sequence then advances to step S7.

In step S7, the control instruction generated by the first aggregator 10 is sent to the first heating devices 100a. The first aggregator 10 uses the first dedicated command for the first heating device group 100 to send the control instruction to the first heating devices 100a. The sequence then advances to step S8.

In step S8, each of the first heating devices 100a receives the control instruction sent from the first aggregator 10. The sequence then advances to step S9.

In step S9, the first heating devices 100a execute the received control instructions.

In step S14, the second aggregator 20 receives the second power adjustment request, the power-usage adjustment request period, and the second request amount sent by the power aggregator 30. The sequence then advances to step S15.

In step S15 the second aggregator 20 distributes the second request amount received from the power aggregator 30 to the second heating devices 200a. Specifically, the second aggregator 20 distributes the second request amount to the second heating devices 200a so that the power usage among all of the second heating devices 200a can be adjusted by the second request amount, by dividing the adjustment request period into a plurality of periods and adjusting only the power usage of some second heating devices 200a during the divided adjustment request periods. The sequence then advances to step S16.

In step S16, the second aggregator 20 determines the control contents so that the power consumptions of the second heating devices 200a can be adjusted by the amounts distributed to the respective second heating devices 200a. The determined control contents are similar as in step S6 and are therefore not described. When the second aggregator 20 determines the control contents of the second heating devices 200a, the second aggregator generates a control instruction for causing the second heating devices 200a to execute the control contents. The sequence then advances to step S17.

In step S17, the control instruction generated by the second aggregator 20 is sent to the second heating devices 200a. The second aggregator 20 uses the second dedicated command for the second heating device group 200 to send the control instruction to the second heating devices 200a. The second dedicated command is different from the first dedicated command for the first heating device group 100. After the control instruction is sent, the sequence advances to step S18.

In step S18, each of the second heating devices 200a receives the control instruction sent from the second aggregator 20. The sequence then advances to step S19.

In step S19, the second heating devices 200a execute the received control instructions.

(6) Characteristics

The demand-response system 1A according to the first embodiment has the features described below.

(6-1)

The demand-response system 1A according to the first embodiment is provided with a first aggregator 10 as an example of the first aggregator apparatus, a second aggregator 20 as an example of the second aggregator apparatus, and a power aggregator 30 as an example of a first upper-tier aggregator apparatus. The first aggregator 10 performs demand-response-related control of the first heating device group 100 including the first heating devices 100a as first heat pump devices. The second aggregator 20 performs demand-response-related control of the second heating device group 200 being different from the first heating device group 100. The power aggregator 30 sends the second power adjustment request (the energy adjustment request) to the first aggregator 10 and the second aggregator 20 using a command being common to the first aggregator 10 and the second aggregator 20. The first aggregator 10 performs demand-response-related control of the first heating device group 100 installed in a plurality of residences using the first dedicated command for the first heating device group 100 in accordance with the second power adjustment request. The second aggregator 20 performs demand-response-related control of the second heating device group 200 installed in a plurality of residences using the second dedicated command for the second heating device group 200, which is different from the first dedicated command, in accordance with the second power adjustment request.

Because the first aggregator 10 performs demand-response-related control of the first heating device group 100 using the first dedicated command and the second aggregator 20 performs demand-response-related control of the second heating device group 200 using the second dedicated command, the power aggregator 30 does not need to ascertain the control specifications of the devices of the first heating device group 100 and the second heating device group 200. in other words, in the demand-response system 1A, accurate demand-response is possible even if the control specifications of the devices of the first heating device group 100 and the second heating device group 200 are not standardized and a command shared by all the devices is not developed.

(6-2)

In the demand-response system 1A according to the first embodiment, the demand-response-related control of the first heating device group 100 includes control for storing heat in the aqueous medium in the heat storage tank 161 as a heat reservoir, and control for releasing the heat from the aqueous medium in the heat storage tank 161, in accordance with the second power adjustment request. The demand-response-related control of the first heating device group 100 may also include control for storing heat in air (indoor air) as a heat reservoir, in accordance with the second power adjustment request.

Because the demand-response-related control of the first heating device group 100 includes control for storing heat in a heat reservoir and control for releasing heat from the heat reservoir, the power usage of the first heating device group 100 can be accurately controlled in accordance with the second power adjustment request of the power aggregator 30. When the storing of heat in a heat reservoir and/or the releasing of heat from the heat reservoir is controlled, more meticulous control is required than in cases such as when only the operating/stopping of the first heating devices 100a of the first heating device group 100 is controlled. However, because the first aggregator 10 performs demand-response-related control of the first heating device group 100 using the first dedicated command, the power aggregator 30 does not need to ascertain the control specifications of the first heating devices 100a of the first heating device group 100. In other words, highly accurate demand-response is possible even if the power aggregator 30 does not ascertain the control specifications of the first heating devices 100a of the first heating device group 100.

(6-3)

In the demand-response system 1A according to the first embodiment, the demand-response-related control of the first heating device group 100 includes control for reducing the power usage of the first heating devices 100a, control for increasing the power usage of the first heating devices 100a, start control for starting the first heating devices 100a, and stop control for safely stopping the first heat pump devices.

Because the demand-response-related control of the first heating device group 100 includes control for increasing or reducing the power usage of the first heating devices 100a, the power usage of the first heating device group 100 can be controlled more accurately in accordance with the energy adjustment request of the power aggregator 30, than when only the operating/stopping of the first heating devices 100a is controlled. Because the demand-response-related control of the first heating device group 100 herein also includes start control of the first heating devices 100a and stop control for safely stopping the first heat pump devices, control based on the starting characteristics of the first heating devices 100a is possible.

When the demand-response-related control includes such control of the first heating devices 100a, more meticulous control is required than in cases such as when simply the operating/stopping of the first heating devices 100a of the first heating device group 100 is controlled. However, because the first aggregator 10 performs demand-response-related control of the first heating device group 100 using the first dedicated command, the power aggregator 30 does not need to ascertain the control specifications of the first heating device group 100.

In other words, highly accurate and highly reliable demand-response is possible even if the power aggregator 30 does not ascertain the control specifications of the first heating devices 100a of the first heating device group 100.

The demand-response-related control of the first heating device group 100 preferably includes control for reducing the power usage of the first heating devices 100a, control for increasing the power usage of the first heating devices 100a, and start control for starting the first heating devices 100a, but demand-response-related control is not limited to including all of these controls and may include only some.

(6-4)

In the demand-response system 1A according to the first embodiment, the power aggregator 30 distributes the target adjustment amount of power usage to the first aggregator 10 and the second aggregator 20, and sends these amounts as the first request amount and the second request amount, respectively, to the first aggregator 10 and the second aggregator 20 together with the second power adjustment request. The first aggregator 10 distributes the first request amount to the first heating devices 100a of the first heating device group 100, and performs demand-response-related control of the first heating device group 100 based on the results of distributing the first request amount. The second aggregator 20 distributes the second request amount to the second heating devices 200a of the second heating device group 200, and performs demand-response-related control of the second heating device group 200 based on the results of distributing the second request amount.

Once the power aggregator 30 distributes the target adjustment amount of power usage to the first and second aggregators 10, 20, the adjustment amount of the power usage is distributed to the devices 100a, 200a of the first and second heating device groups 100, 200 by the first and second aggregators 10, 20. Therefore, the power aggregator 30 is required to ascertain the supply/demand adjustment characteristics of the first and second aggregators 10, 20, but is not required to ascertain the control specifications for the first heating devices 100a of the first heating device group 100 and for the second heating devices 200a of the second heating device group 200. In other words, even if the power aggregator 30 herein does not ascertain the control specifications fir the first heating devices 100a of the first heating device group 100 and for the second heating devices 200a of the second heating device group 200, demand-response can be accurately achieved.

(6-5)

In the demand-response system 1A according to the first embodiment, the second heating device group 200 includes second heating devices 200a as devices for storing energy.

Because the second heating device group 200 includes second heating devices 200a capable of storing energy (heat), the power usage of the second heating device group 200 can be accurately controlled in accordance with the second power adjustment request of the power aggregator 30.

(7) Modifications

Modifications of the present embodiment are indicated below. Multiple modifications may be appropriately combined as long as they do not contradict each other.

(7-1) Modification 1A

In the above embodiment, the first heating devices 100a were given as an example of the first heat pump devices, but the first heat pump devices are not limited thereto. The first heat pump devices may be, e.g., room air-conditioners, package air-conditioners, multi air-conditioners, heat pump hot water suppliers, refrigeration devices, or the like. In this case, the first aggregator 10 may distribute the first request amount to the devices by a method appropriate for the characteristics of the heat pump devices being controlled, and determine the control contents of the devices based on the distribution results.

(7-2) Modification 1B

In the above embodiment, the devices of the first heating device group 100 and the second heating device group 200 are the same type of heat pump device, and both are heating devices having similar configurations, but are not limited thereto. For example, the first heating device group 100 may be provided with a group of first heating devices 100a, and the second heating device group 200 may be provided with a group of room air-conditioners. In this case, the second aggregator 20 may distribute the second request amount to the devices by a method appropriate for the characteristics etc. of the devices (e.g. the room air-conditioners), and may determine the control contents for the devices based on the distribution results.

(7-3) Modification 1C

Figure 8:
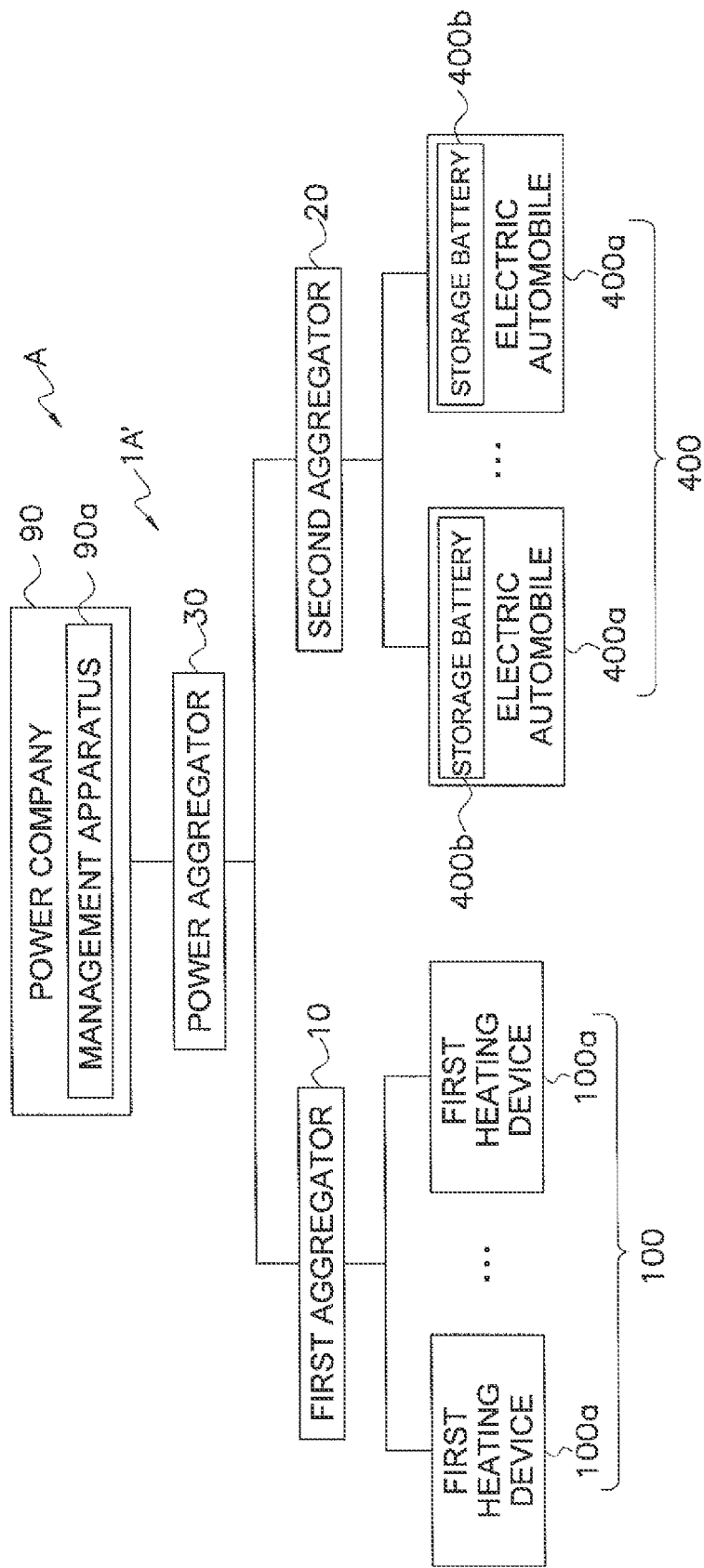
FIG. 8 is an explanatory diagram for illustrating the demand-response system according to Modification Example 1C of the present invention.

The devices included in the second heating device group 200 need not be heat pump devices. For example, the second aggregator 20 of a demand-response system 1A' may perform demand-response-related control of an electric automobile group 400 comprising electric automobiles 400a having storage batterys 400b, as shown in FIG. 8.

Because the electric automobile group 400 is provided with electric automobiles 400a in which electricity is stored in storage batterys 400b, the power usage of the electric automobile group 400 can be accurately controlled in accordance with the second power adjustment request of the power aggregator 30.

(7-4) Modification 1D

In the above embodiment, the demand-response system 1A has two device aggregators (the first aggregator 10 and the second aggregator 20), but the number of device aggregators is not limited thereto. The demand-response system may have three or more device aggregators.

Even when the demand-response system has three or more device aggregators, the device aggregators use dedicated commands to perform demand-response-related control on one group of devices installed in a plurality of buildings. Each of the groups of devices is provided with devices having the same control specifications. For example, the groups of devices are configured differently for each manufacturer and each type of device.

With such a configuration, there is no need to design a standardized control specification for a wide variety of devices, or to develop a command to be shared by all of the devices. Therefore, the manufactures can easily participate in the demand-response system and power can be easily adjusted for supply and demand.

(7-5) Modification 1E

In the demand-response system 1A according to the above embodiment, the first heating device group 100 is composed only of first heating devices 100a manufactured by a manufacturer X1, and the second heating device group 200 is composed only of second heating devices 200a manufactured by a manufacturer X2, but the groups are not limited thereto. For example, the first heating device group 100 may include heating devices that are manufactured by a manufacturer other than manufacturer X1, and that can be controlled using a first dedicated command for the first heating device group 100. Additionally, the second heating device group 200 may include heating devices that are manufactured by a manufacturer other than manufacturer X2, and that can be controlled using a second dedicated command for the second heating device group 200.

<Second Embodiment>

A demand-response system 1B according to a second embodiment of the present invention will be described with reference to the drawings. The following embodiment is an example and can be appropriately modified within a range that does not deviate from the scope of the invention.

(1) Overall Configuration

Figure 9:
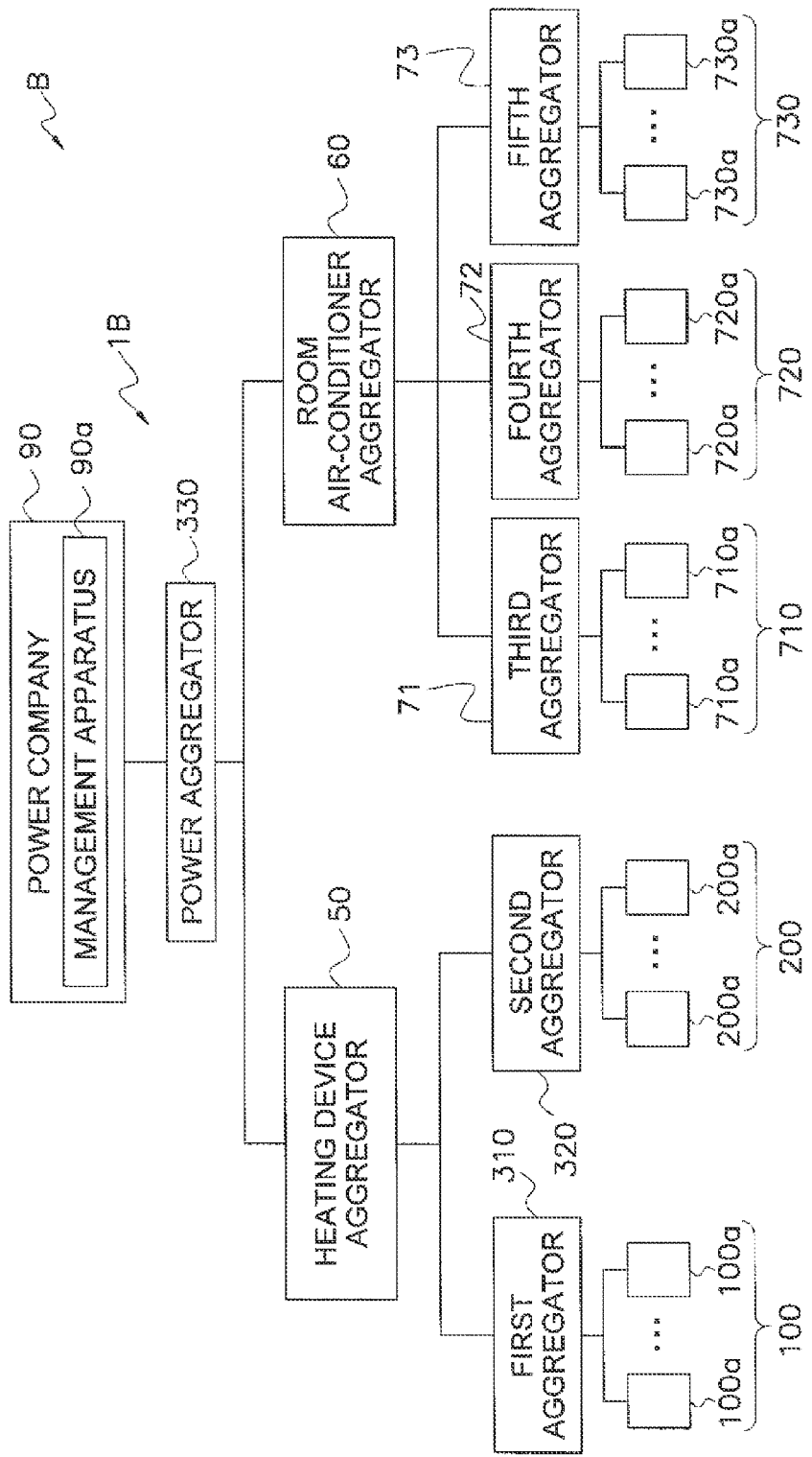
FIG. 9 is a schematic diagram of a power network including the demand-response system according to the second embodiment of the present invention.

FIG. 9 shows an overall schematic diagram of a power network B including the demand-response system 1B. The power network B includes a power company 90, the demand-response system 1B, first and second heating device groups 100, 200, and first through third room air-conditioner groups 710, 720, 730. The demand-response system 1B is provided with a power aggregator 330, an heating device aggregator 50, a room air-conditioner aggregator 60, first and second aggregators 310, 320, and third through fifth aggregators 71, 72, 73, The demand-response system 1B differs from the demand-response system 1A in having aggregators (the heating device aggregator 50 and the room air-conditioner aggregator 60) for each type of device on the lower-tier side of the power aggregator 330. Because the demand-response system 1B has many points in common with the demand-response system 1A, the points of difference with the demand-response system 1A are the focus of the description.

The power company 90 supplies power to the first and second heating device groups 100, 200 and the first through third room air-conditioner groups 710, 720, 730 owned by the power consumers. The power company 90 also supplies power to devices (not shown) that are owned by the power consumers and are not included in the first and second heating device groups 100, 200 or the first through third room air-conditioner groups 710, 720, 730.

The power company 90 has a management apparatus 90a. The management apparatus 90a sends a power-usage adjustment request to the power aggregator 330 as needed, so that the power supply of the power company 90 and the power usage of the power consumers are balanced. The management apparatus 90a is similar to that of the demand-response system 1A of the first embodiment and is therefore not described.

The power aggregator 330 herein is one example of a second upper-tier aggregator apparatus. The power aggregator 330 is connected via communication lines to the management apparatus 90a of the power company 90 on the upper-tier side (see FIG. 9). The power aggregator 330 is also connected via communication lines to the heating device aggregator 50 and the room air-conditioner aggregator 60 on the lower-tier side (see FIG. 9).

Upon receiving a first power adjustment request from the management apparatus 90a, the power aggregator 330, in order to comply with the request, sends a power-usage adjustment request to the heating device aggregator 50 and the room air-conditioner aggregator 60. The power-usage adjustment request sent by the power aggregator 330 to the heating device aggregator 50 and the room air-conditioner aggregator 60 will be referred as the third power adjustment request in the following.

Upon receiving the third power adjustment request from the power aggregator 330, the heating device aggregator 50, in order to comply with the request, sends a power-usage adjustment request to the first aggregator 310 and the second aggregator 320. The power-usage adjustment request sent by the heating device aggregator 50 to the first and second aggregators 310, 320 will be referred as the fourth power adjustment request in the following. The fourth power adjustment request is one example of an energy adjustment request.

Upon receiving the third power adjustment request from the power aggregator 330, the room air-conditioner aggregator 60, in order to comply with the request, sends a power-usage adjustment request to the third through fifth aggregators 71, 72, 73. The power-usage adjustment request sent by the room air-conditioner aggregator 60 to the third through fifth aggregators 71, 72, 73 will be referred as the fifth power adjustment request in the following. The fifth power adjustment request is one example of an energy adjustment request.

The first aggregator 310 receives an energy adjustment request (a fourth power adjustment request) not from the power aggregator 330 but from the heating device aggregator 50, unlike the demand-response system 1A. The first aggregator 310 is similar to the first aggregator 10 of the demand-response system 1A in other respects and is therefore not described. The second aggregator 320 is similar to the first aggregator 310 and is therefore not described.

The third aggregator 71 is one example of a first aggregator apparatus. The fourth and fifth aggregators 72, 73 are an example of a second aggregator apparatus. The third, fourth, and fifth aggregators 71, 72, 73 are similar to the first aggregator 310 except for the energy adjustment request (the fifth power adjustment request) being received from the room air-conditioner aggregator 60, and the objective of power usage control being the first, second, and third room air-conditioner groups 710, 720, 730, respectively, and these aggregators 71, 72, 73 are therefore not described.

The first and second heating device groups 100, 200 are similar to the heating device groups of the power network A of the first embodiment and are therefore not described.

The first through third room air-conditioner groups 710, 720, 730 are heat pump devices. The first room air-conditioner group 710 is provided with a plurality of first room air-conditioners 710a. The second room air-conditioner group 720 is provided with a plurality of second room air-conditioners 720a. The third room air-conditioner group 730 is provided with a plurality of third room air-conditioners 730a.

The first heating devices 100a are one example of the first heat pump devices. The second heating devices 200a are one example of the second heat pump devices. The first and second heating devices 100a, 200a are similar as the heating devices of the power network A of the first embodiment and are therefore not described.

The first room air-conditioners 710a are an example of the first heat pump devices. The second and third room air-conditioners 720a, 730a are an example of the second heat pump devices. The first through third room air-conditioners 710a, 720a, 730a are common, widely used devices, and the structures, functions, and other features thereof are therefore not described.

All of the first room air-conditioners 710a constituting the first room air-conditioner group 710 are devices having identical control specifications. Specifically, the first room air-conditioners 710a herein are all products manufactured by a certain manufacturer Y1. The third aggregator 71 performs demand-response-related control of the first room air-conditioner group 710 using a third dedicated command for the first room air-conditioner group 710 (a dedicated command specific to the first room air-conditioners 710a of the manufacturer Y1). Communication between the third aggregator 71 and the first room air-conditioners 710a is conducted using a unique communication protocol of the manufacturer Y1. However, the communication between the third aggregator 71 and the first room air-conditioners 710a is not limited to such a scheme; a generic communication protocol may be employed.

All of the second room air-conditioners 720a constituting the second room air-conditioner group 720 are devices having identical control specifications. Specifically, the second room air-conditioners 720a herein are all products manufactured by a certain manufacturer Y2. The fourth aggregator 72 performs demand-response-related control of the second room air-conditioner group 720 using a fourth dedicated command for the second room air-conditioner group 720 (a dedicated command specific to the second room air-conditioners 720a of the manufacturer Y2). Communication between the fourth aggregator 72 and the second room air-conditioners 720a is conducted using a unique communication protocol of the manufacturer Y2. However, the communication between the fourth aggregator 72 and the second room air-conditioners 720a is not limited to such a scheme; a generic communication protocol may be employed.

All of the third room air-conditioners 730a constituting the third room air-conditioner group 730 are devices having identical control specifications. Specifically, the third room air-conditioners 730a herein are all products manufactured by a certain manufacturer Y3. The fifth aggregator 73 performs demand-response-related control of the third room air-conditioner group 730 using a fifth dedicated command for the third room air-conditioner group 730 (a dedicated command specific to the third room air-conditioners 730a of the manufacturer Y3). Communication between the fifth aggregator 73 and the third room air-conditioners 730a is conducted using a unique communication protocol of the manufacturer Y3. However, the communication between the fifth aggregator 73 and the third room air-conditioners 730a is not limited to such a scheme; a generic communication protocol may be employed.

The fourth dedicated command for the second room air-conditioner group 720 is different from the third dedicated command for the first room air-conditioner group 710. The fifth dedicated command for the third room air-conditioner group 730 is different from both the third dedicated command for the first room air-conditioner group 710 and the fourth dedicated command for the second room air-conditioner group 720.

(2) Detailed Configuration

The power aggregator 330, the heating device aggregator 50, and the first aggregator 310 are described below.

The room air-conditioner aggregator 60 is similar to the heating device aggregator 50, except for the three third through fifth aggregators 71, 72, 73 being connected to the lower-tier side, and is therefore not described. The second aggregator 320 and the third through fifth aggregators 71, 72, 73 are similar as the first aggregator 310 and are therefore not described.

(2-1) Power Aggregator

Figure 10:
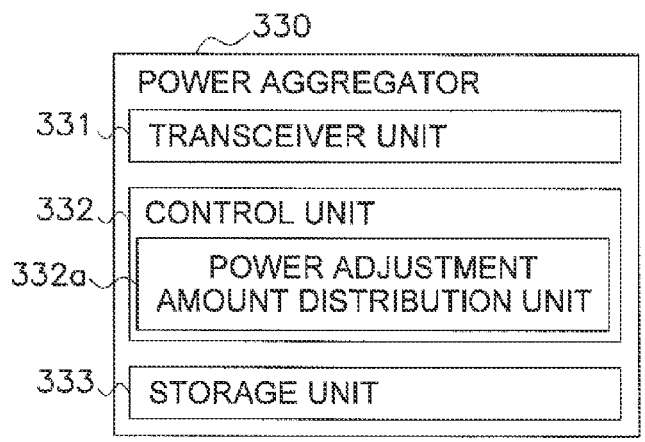
FIG. 10 is a block diagram of the power aggregator of the demand-response system of FIG. 9.

The power aggregator 330 herein is an example of a second upper-tier aggregator apparatus for sending a third power adjustment request to the heating device aggregator 50 and the room air-conditioner aggregator 60. The power aggregator 330 has primarily a transceiver unit 331, a control unit 332, and a storage unit 333, as shown in FIG. 10, (2-1-1) Transceiver Unit The transceiver unit 331 is connected via communication lines to the management apparatus 90a of the power company 90 on the upper-tier side. The transceiver unit 331 is also connected via communication lines to the heating device aggregator 50 and the room air-conditioner aggregator 60 on the lower-tier side. The transceiver unit 331 transfers a variety of information with the management apparatus 90a and with the heating device aggregator 50 and the room air-conditioner aggregator 60.

Specifically, the transceiver unit 331 receives, e.g., the first power adjustment request (a power-usage adjustment request), along with the power-usage adjustment request period and the target adjustment amount of power usage, from the management apparatus 90a. The transceiver unit 331 receives, e.g., information pertaining to the power usage of the first and second heating device groups 100, 200 sent from the heating device aggregator 50, and information pertaining to the power usage of the first through third room air-conditioner groups 710, 720, 730 sent from the room air-conditioner aggregator 60. The transceiver unit 331 sends to the management apparatus 90a, e.g., the total of the power usage of the first and second heating device groups 100, 200 and the power usage of the first through third room air-conditioner groups 710, 720, 730 calculated by the control unit 332, described hereinafter. The transceiver unit 331 sends, e.g., a first divided target adjustment amount calculated by a power adjustment amount distribution unit 332a of the control unit 332 described hereinafter, along with the third power adjustment request, to the heating device aggregator 50. The transceiver unit 331 also sends a second divided target adjustment amount calculated by the power adjustment amount distribution unit 332a, along with the third power adjustment request, to the room air-conditioner aggregator 60.

The power aggregator 330 uses a command shared by the heating device aggregator 50 and the room air-conditioner aggregator 60 when sending the third power adjustment request to the heating device aggregator 50 and the room air-conditioner aggregator 60. identical communication protocol is used for the power aggregator 330 to communicate with the heating device aggregator 50 and the room air-conditioner aggregator 60.

(2-1-2) Control Unit

The control unit 332, is primarily provided with a CPU. The control unit 332 executes a variety of processes by executing programs stored in the storage unit 333, described hereinafter. For example, the control unit 332 performs a variety of calculations based on the information received by the transceiver unit 331. The control unit 332 writes the information received by the transceiver unit 331, the results of the variety of calculations of the control unit 332, and or the like into the storage unit 333, and reads information from the storage unit 333 as necessary.

Specifically, the control unit 332, e.g., totals the power usage of the first and second heating device groups 100, 200 and the power usage of the first through third room air-conditioner groups 710, 720, 730 received by the transceiver unit 331, and writes this total into the storage unit 333. As a result, the totals of the power usage of the first and second heating device groups 100, 200 and the power usage of the first through third room air-conditioner groups 710, 720, 730 are stored as time-series data in the storage unit 333. The control unit 332 also reads the total of the power usage of the first and second heating device groups 100, 200 and the power usage of the first through third room air-conditioner groups 710, 720, 730 from the storage unit 333, either periodically or upon request by the management apparatus 90a. The control unit 332 then directs the transceiver unit 331 to send the total of the power usage of the first and second heating device groups 100, 200 and the power usage of the first through third room air-conditioner groups 710, 720, 730 to the management apparatus 90a.

Further, the control unit 332, for example, calculates levels of achievement in response to the third power adjustment request respectively for the heating device aggregator 50 and the room air-conditioner aggregator 60 by using the power usage of the first and second heating device groups 100, 200 and the power usage of the first through third room air-conditioner groups 710, 720, 730 received by the transceiver unit 331. In other words, the control unit 332 calculates how well the heating device aggregator 50 and the room air-conditioner aggregator 60 were able to adjust their power usage respectively in response to the first divided target adjustment amount and the second divided target adjustment amount sent by the power aggregator 330. The calculated levels of achievement in response to the third power adjustment request are stored in the storage unit 333.

The control unit 332 has the power adjustment amount distribution unit 332a, described below, as a functional unit.

(2-1-2-1) Power Adjustment Amount Distribution Unit

The power adjustment amount distribution unit 332a distributes the target adjustment amount, which was received by the transceiver unit 331 from the management apparatus 90a, to the heating device aggregator 50 and the room air-conditioner aggregator 60, and distributed amounts are respectively calculated as the first divided target adjustment amount and the second divided target adjustment amount. The way of thinking about distributing the target adjustment amount to the heating device aggregator 50 and the room air-conditioner aggregator 60 is similar to the way of thinking about distributing the target adjustment amount to the first and second aggregators 10, 20 in the first embodiment, and is therefore not described.

(2-1-3) Storage Unit

The storage unit 333 is primarily provided with RAM, ROM, a hard disk, and the like. A variety of programs and/or a variety of information used by the control unit 332 are stored in the storage unit 333.

The storage unit 333 stores information pertaining to, e.g., the maximum consumed power of the first and second heating device groups 100, 200 and the first through third room air-conditioner groups 710, 720, 730. The storage unit 333 also stores as time-series data, e.g., information pertaining to the power usage of the first and second heating device groups 100, 200 and information pertaining to the power usage of the first through third room air-conditioner groups 710, 720, 730, which were received by the transceiver unit 331, and the total of the power usage of the first and second heating device groups 100, 200 and the power usage of the first through third room air-conditioner groups 710, 720, 730 as calculated by the control unit 332. The storage unit 333 also stores, e.g., levels of achievement of the heating device aggregator 50 and the room air-conditioner aggregator 60 in response to the third power adjustment request, as calculated by the control unit 332.

(2-2) Heating Device Aggregator

Figure 11:
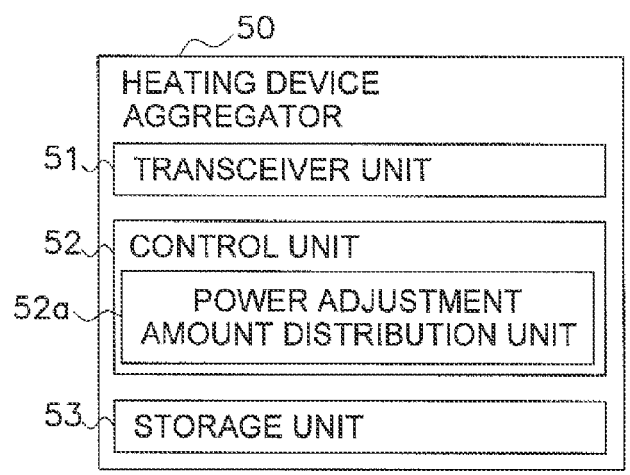
FIG. 11 is a block diagram of the heating device aggregator of the demand-response system of FIG. 9.

The heating device aggregator 50 is an example of a first upper-tier aggregator apparatus for sending the fourth power adjustment request (an energy adjustment request) to the first and second aggregators 310, 320. The heating device aggregator 50 has primarily a transceiver unit 51, a control unit 52, and a storage unit 53, as shown in FIG. 11.

(2-2-1) Transceiver Unit

The transceiver unit 51 is connected via communication lines to the power aggregator 330 on the upper-tier side. The transceiver unit 51 is also connected via communication lines to the first and second aggregators 310, 320 on the lower-tier side. The transceiver unit 51 transfers a variety of information with the power aggregator 330 and the first and second aggregators 310, 320.

Specifically, the transceiver unit 51 receives, e.g., the third power adjustment request, along with the power-usage adjustment request period and the first divided target adjustment amount, from the power aggregator 330. The transceiver unit 51 receives, e.g., information pertaining to the power usage of the first heating device group 100 sent from the first aggregator 310, and information pertaining to the power usage of the second heating device group 200 sent from the second aggregator 320. The transceiver unit 51 sends, e.g., the total of the power usage of the first heating device group 100 and the power usage of the second heating device group 200, calculated by the control unit 52 described hereinafter, to the power aggregator 330. The transceiver unit 51 sends, e.g., a first request amount calculated by a power adjustment amount distribution unit 52*a* of the control unit 52, described hereinafter, to the first aggregator 310 along with the fourth power adjustment request (an energy adjustment request). The transceiver unit 51 sends, e.g., a second request amount calculated by the power adjustment amount distribution unit 52*a* described hereinafter to the second aggregator 320 along with the fourth power adjustment request.

The heating device aggregator 50 uses a command shared by the first and second aggregators 310, 320 when sending the fourth power adjustment request to the first and second aggregators 310, 320. An identical communication protocol is used for communication between the power aggregator 330 and the first and second aggregators 310, 320.

(2-2-2) Control Unit

The control unit 52 is primarily provided with a CPU. The control unit 52 executes a variety of processes by executing programs stored in the storage unit 53, described hereinafter. For example, the control unit 52 performs a variety of calculations based on the the information received by the transceiver unit 51. The control unit 52 also writes the information received by the transceiver unit 51, the results of the variety of calculations of the control unit 52, and or the like into the storage unit 53, and reads information from the storage unit 53 as necessary.

Specifically, the control unit 52, e.g., totals the power usage of the first heating device group 100 and the power usage of the second heating device group 200 received by the transceiver unit 51, and writes this total into the storage unit 53. As a result, the totals of the power usage of the first heating device group 100 and the power usage of the second heating device group 200 are stored as time-series data in the storage unit 53. The control unit 52 reads the total of the power usage of the first heating device group 100 and the power usage of the second heating device group 200 from the storage unit 53, either periodically or upon request by the power aggregator 330. The control unit 52 then directs the transceiver unit 51 to send the read total of the power usage of the first heating device group 100 and the power usage of the second heating device group 200 to the power aggregator 330.

In addition, for example, the control unit 52 calculate levels of achievement in response to the fourth power adjustment request respectively for the first and second aggregators 310, 320 by using the power usage of the first heating device group 100 and the power usage of the second heating device group 200 received by the transceiver unit 51. In other words, the control unit 52 calculates how well the first and second aggregators 310, 320 were able to adjust their respective power usage respectively in response to the first request amount and the second request amount sent by the heating device aggregator 50. The calculated levels of achievement in response to the fourth power adjustment request are stored in the storage unit 53.

The control unit 52 has the power adjustment amount distribution unit 52*a*, described below, as a functional unit.

(2-2-2-1) Power Adjustment Amount Distribution Unit

The power adjustment amount distribution unit 52*a* distributes the first divided target adjustment amount, received by the transceiver unit 51 from the power aggregator 330, to the first and second aggregators 310, 320, and the distributed amounts are respectively calculated as the first request amount and the second request amount. The way of thinking about distributing the first divided target adjustment amount to the first and second aggregators 310, 320 is similar to the way of thinking about distributing the target adjustment amount of power usage to the first and second aggregators 10, 20 by the power aggregator 30 in the first embodiment, and is therefore not described.

(2-2-3) Storage Unit

The storage unit 53 is primarily provided with RAM, ROM, a hard disk, and the like. A variety of programs and/or a variety of information used by the control unit 52 are stored in the storage unit 53.

The storage unit 53 stores information pertaining to, e.g., the maximum consumed power of the first heating device group 100 and the second heating device group 200. The storage unit 53 stores, as time-series data, information relating to the power usage of the first and second heating device groups 100, 200 received by the transceiver unit 51, and the total of the power usage of the first heating device group 100 and the power usage of the second heating device group 200 calculated by the control unit 52. The storage unit 53 also stores, e.g., the levels of achievement of the first aggregator 310 and the second aggregator 320 in response to the fourth power adjustment request, as calculated by the control unit 52, (2-3) First Aggregator The first aggregator 310 performs demand-response-related control of the first heating device group 100 comprising the first heating devices 100a which use heat pumps as heat sources. More specifically, the first aggregator 310 performs demand-response-related control of the first heating device group 100 installed in a plurality of residences in response to the fourth power adjustment request from the heating device aggregator 50 with a first dedicated command for the first heating device group 100.

The first aggregator 310 is identical to the first aggregator 10 of the first embodiment, except that the device located on upper-tier side is the heating device aggregator 50 and not the power aggregator 30, and the first request amount from the heating device aggregator 50 is received together with the fourth power adjustment request, and accordingly is not described in detail here.

(3) Power Usage Adjustment Control by Demand-Response System

Figure 12:
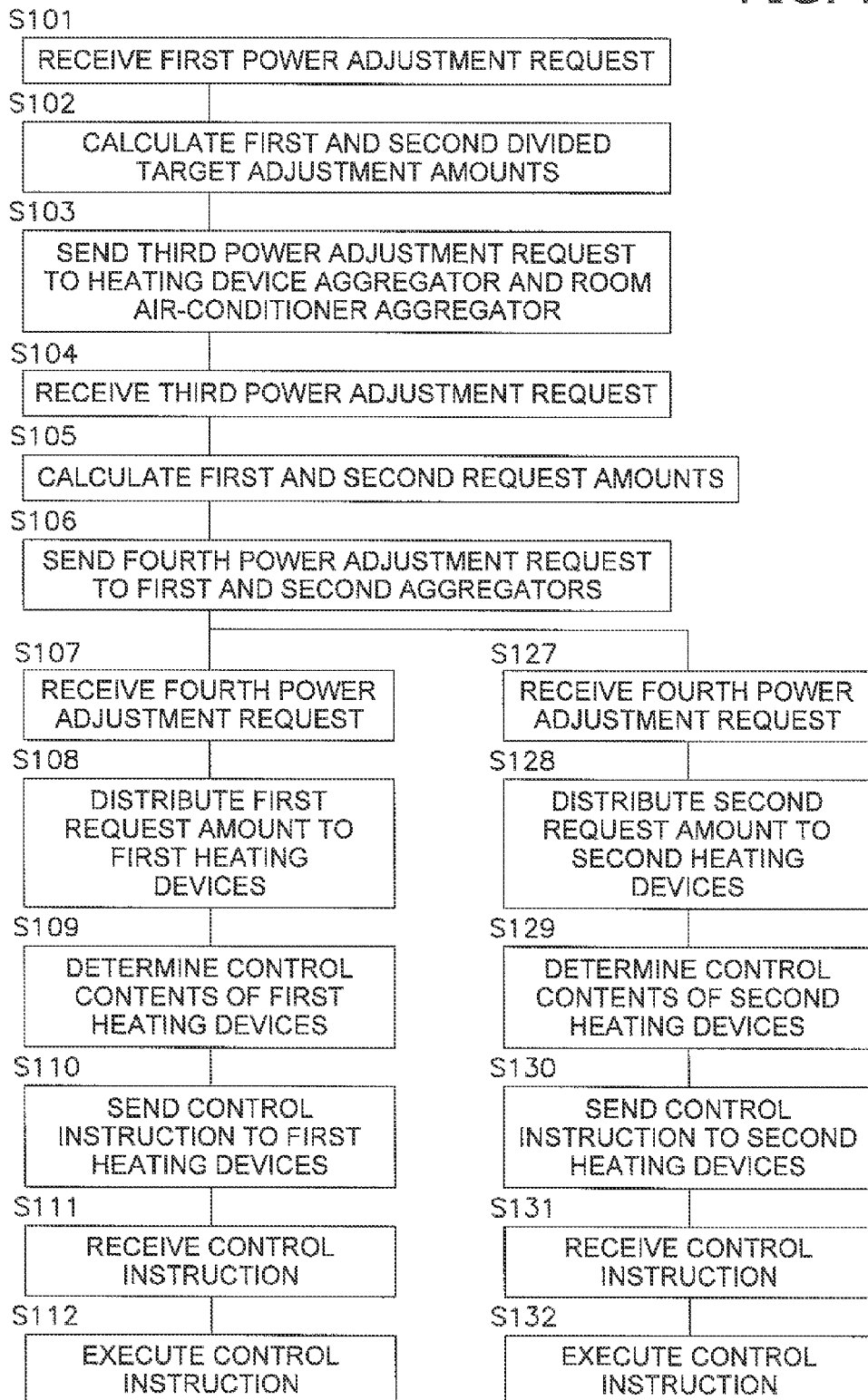
FIG. 12 is a flowchart for describing the power consumption adjustment control in the demand-response system of FIG. 9.

The adjustment control of the power usage of the first and second heating device groups 100, 200 and the first through third room air-conditioner groups 710, 720, 730 performed by the demand-response system 1B when the first power adjustment request has been sent to the power aggregator 300 from the management apparatus 90a will be described with reference to the flowchart in FIG. 12.

In Step S101, the power aggregator 330 receives the first power adjustment request, the power-usage adjustment request period, and the target adjustment amount of power usage sent by the management apparatus 90a. The sequence then advances to step S102.

In Step S102, the power aggregator 330 distributes the target adjustment amount of power usage received from the management apparatus 90a to the heating device aggregator 50 and the room air-conditioner aggregator 60, and calculates the distributed amounts as the first divided target adjustment amount and the second divided target adjustment amount, respectively. Specifically, the power aggregator 330 distributes the target adjustment amount to the heating device aggregator 50 and the room air-conditioner aggregator 60 and calculates distributed amounts as the first divided target adjustment amount and the second divided target adjustment amount based on, e.g., the total of the current power usage of the first and second heating device groups 100, 200, and the total of the current power usage of the first through third room air-conditioner groups 710, 720, 730. The sequence advances to Step S103 after the first and second divided target adjustment amounts have been calculated.

In Step S103, the power aggregator 330 sends the calculated first divided target adjustment amount and power-usage adjustment request period to the heating device aggregator 50 together with the third power adjustment request. In addition, the power aggregator 330 sends the calculated second divided target adjustment amount and power-usage adjustment request period to the room air-conditioner aggregator 60 together with the third power adjustment request. The power aggregator 330 sends the third power adjustment request, etc., to the heating device aggregator 50 and the room air-conditioner aggregator 60 using a command that is common to the heating device aggregator 50 and the room air-conditioner aggregator 60.

The operations of the room air-conditioner aggregator 60, the third through fifth aggregators 71-73, and the first through third room air-conditioner groups 710, 720, 730 after the room air-conditioner aggregator 60 has received the third power adjustment request are similar to the operations of the heating device aggregator 50, the first and second aggregators 310, 320, and the first and second heating device groups 100, 200 after the heating device aggregator 50 has received the third power adjustment request. Accordingly, no description shall be made hereunder of the operations of the room air-conditioner aggregator 60 and the lower-tier apparatuses and devices (the third through fifth aggregators 71-73 and the first through third room air-conditioner groups 710, 720, 730).

In Step S104, the heating device aggregator 50 receives the third power adjustment request, the power-usage adjustment request period, and the first divided target adjustment amount sent by the power aggregator 330. The sequence then advances to step S105.

In Step S105, the heating device aggregator 50 distributes the first divided target adjustment amount received from the power aggregator 330 to the first aggregator 310 and the second aggregator 320, and calculates the distributed amounts as the first request amount and the second request amount, respectively. Specifically, the heating device aggregator 50 distributes the first divided target adjustment amount to the first aggregator 310 and the second aggregator 320, and calculates the distributed amounts as the first request amount and the second request amount, based on the current power usage of the first heating device group 100 and the current power usage of the second heating device group 200. After the first request amount and the second request amount are calculated, the sequence advances to step S106.

In Step S106, the heating device aggregator 50 sends the calculated first request amount and power-usage adjustment request period to the first aggregator 310 together with the fourth power adjustment request. In addition, the heating device aggregator 50 sends the calculated second request amount and power-usage adjustment request period to the second aggregator 320 together with the fourth power adjustment request. The heating device aggregator 50 sends the fourth power adjustment request, etc., to the first aggregator 310 and the second aggregator 320 using a command that is common to the first and second aggregators 310, 320. The sequence then advances to step S107 and step S127.

Steps S107 through S112 described below are executed by the first aggregator 310 and the first heating device group 100 controlled by the first aggregator 310. Steps S127 to S132 are executed by the second aggregator 320, and the second heating device group 200 controlled by the second aggregator 320. Steps S107 to S112 are executed in parallel with step S127 to S132.

In Step S107, the first aggregator 310 receives the fourth power adjustment request, the power-usage adjustment request period, and the first request amount sent by the heating device aggregator 50. The sequence then advances to step S108.

In Step S108, the first aggregator 310 distributes the first request amount received from the heating device aggregator 50 to the first heating devices 100a, Specifically, the first aggregator 310 distributes the first request amount to the first heating devices 100a so that, e.g., the amounts distributed to the first heating devices 100a are proportional to the current power usage of the respective first heating devices 100a. The sequence then advances to step S109.

In Step S109, the first aggregator 310 determines the control contents so that the respective first heating devices 100a are capable of adjusting the power consumption by the amounts respectively distributed to the first heating devices 100a. The control contents of the first heating devices 100a as determined by the first aggregator 310 is similar to those in the first embodiment, and is accordingly not described here. When the first aggregator 310 determines the control contents of the first heating devices 100a, the first aggregator generates a control instruction for causing the first heating devices 100a to execute the control contents. The sequence then advances to step S110.

In Step S110, the control instruction generated by the first aggregator 310 is sent to the first heating devices 100a. The first aggregator 310 uses the first dedicated command for the first heating device group 100 to send the control instruction to the first heating devices 100a. The sequence then advances to step S111.

In step S111, each of the first heating devices 100a receives the control instruction sent from the first aggregator 310. The sequence then advances to step S112.

In step S112, the first heating devices 100a execute the received control instructions.

Steps S127 through S132 are similar to Steps S107 through S112, and are accordingly not described here.

(4) Characteristics

The demand-response system 1B according to the second embodiment has the features described below. The demand-response system 1B also has the same features as in sections (6-2), (6-3), and (6-5) of the first embodiment.

(4-1)

The demand-response system 1B according to the second embodiment is provided with a first aggregator 310 as an example of the first aggregator apparatus, a second aggregator 320 as an example of the second aggregator apparatus, and a heating device aggregator 50 as an example of a first upper-tier aggregator apparatus. The first aggregator 310 performs demand-response-related control of the first heating device group 100 including the first heating devices 100a used as heat pump devices. The second aggregator 320 performs demand-response-related control of the second heating device group 200 being different from the first heating device group 100. The heating device aggregator 50 sends the fourth power adjustment request (energy adjustment request) to the first aggregator 310 and the second aggregator 320 using a command being common to the first aggregator 310 and the second aggregator 320. The first aggregator 310 performs demand-response-related control of the first heating device group 100 installed in a plurality of residences using the first dedicated command for the first heating device group 100 in accordance with the fourth power adjustment request. The second aggregator 320 performs demand-response-related control of the second heating device group 200 installed in a plurality of residences using the second dedicated command for the second heating device group 200, which is different from the first dedicated command, in response to the fourth power adjustment request.

In the present embodiment, since the first aggregator 310 performs demand-response-related control of the first heating device group 100 using a first dedicated command and the second aggregator 320 performs demand-response-related control of the second heating device group 200 using a second dedicated command, there is no need for the power aggregator 330 and the heating device aggregator 50 to ascertain the control specifications of the first heating device group 100 or the second heating device group 200. In other words, in the demand-response system 1B, highly accurate demand-response is possible even if the control specifications of the first heating device group 100 and the second heating device group 200 are not standardized and a command shared by all of the devices is not developed.

(4-2)

In the demand-response system 1B according to the second embodiment, the heating device aggregator 50 distributes the first divided target adjustment amount to the first aggregator 310 and the second aggregator 320, and sends these distributed amounts as a first request amount and a second request amount, respectively, to the first aggregator 310 and the second aggregator 320, together with the fourth power adjustment request. The first aggregator 310 distributes the first request amount to the respective first heating devices 100a of the first heating device group 100, and performs demand-response-related control of the first heating device group 100 based on the results of distributing the first request amount. The second aggregator 320 distributes the second request amount to the respective second heating devices 200a of the second heating device group 200, and performs demand-response-related control of the second heating device group 200 based on the results of distributing the second request amount.

In the present embodiment, once the heating device aggregator 50 distributes the first divided target adjustment amount to the first and second aggregators 310, 320, the adjustment amount of the power usage is distributed to the first and second heating device groups 100, 200 by the first and second aggregators 310, 320. Therefore, the heating device aggregator 50 is required to ascertain the supply/demand adjustment characteristics of the first and second aggregators 310, 320, but is not required to ascertain the control specifications for the first heating devices 100a of the first heating device group 100 and the second heating devices 200a of the second heating device group 200. In other words, in the present embodiment, even if the heating device aggregator 50 does not ascertain the control specifications for the first heating devices 100a of the first heating device group 100 and the second heating devices 200a of the second heating device group 200, demand response can be accurately achieved.

(4-3)

The demand-response system 1B according to the second embodiment is provided with a power aggregator 330 as the second upper-tier aggregator apparatus for sending the first divided target adjustment amount to the heating device aggregator 50. The first heating device group 100 includes solely a plurality of first heating devices 100a. The second heating device group 200 includes solely a plurality of second heating devices 200a as second heat pump devices. The first heating devices 100a and the second heating devices 200a are the same type of heat pump devices.

In the present embodiment, the heating device aggregator 50 distributes the target adjustment amount to the first and second aggregators 310, 320 for controlling the same type of heat pump devices (heating devices in the present embodiment). Therefore, the heating device aggregator 50 can distribute the first divided target adjustment amount appropriately to the first and second aggregators 310, 320 based on the characteristics of the heating devices. As a result, accurate demand-response is easily achieved.

(5) Modifications

Modifications of the demand-response system 1B according to the second embodiment are given below. The modifications may be used in a plurality of combinations as long as no conflict is encountered therebetween. The demand-response system 1B may also have the features of the modifications of the first embodiment as long as no conflict is encountered.

(5-1) Modification 2A

In the embodiment above, the power aggregator 330, the heating device aggregator 50, and the room air-conditioner aggregator 60 are mutually independent apparatuses, as shown in FIG. 9; however, such an arrangement is not provided by way of limitation. For example, the functions of the heating device aggregator and the room air-conditioner aggregator can be implemented by a function unit of the power-aggregator.

(5-2) Modification 2B

In the embodiment above, only two aggregators (the heating device aggregator 50 and the room air-conditioner aggregator 60) are present on a lower tier relative to the power aggregator 330; however, such an arrangement is not provided by way of limitation. For example, a package air-conditioner aggregator, a multiple-air-conditioner aggregator, a heat-pump-water-heater aggregator, a refrigeration device aggregator, an electric automobile aggregator, or another aggregator may be present on a lower tier relative to the power aggregator 330.

<Third Embodiment>

A demand-response system 1C according to a third embodiment of the present invention shall now be described with reference to the drawings. The following embodiment is an example and can be appropriately modified within a range that does not deviate from the scope of the invention.

(1) Overall Configuration

Figure 13:
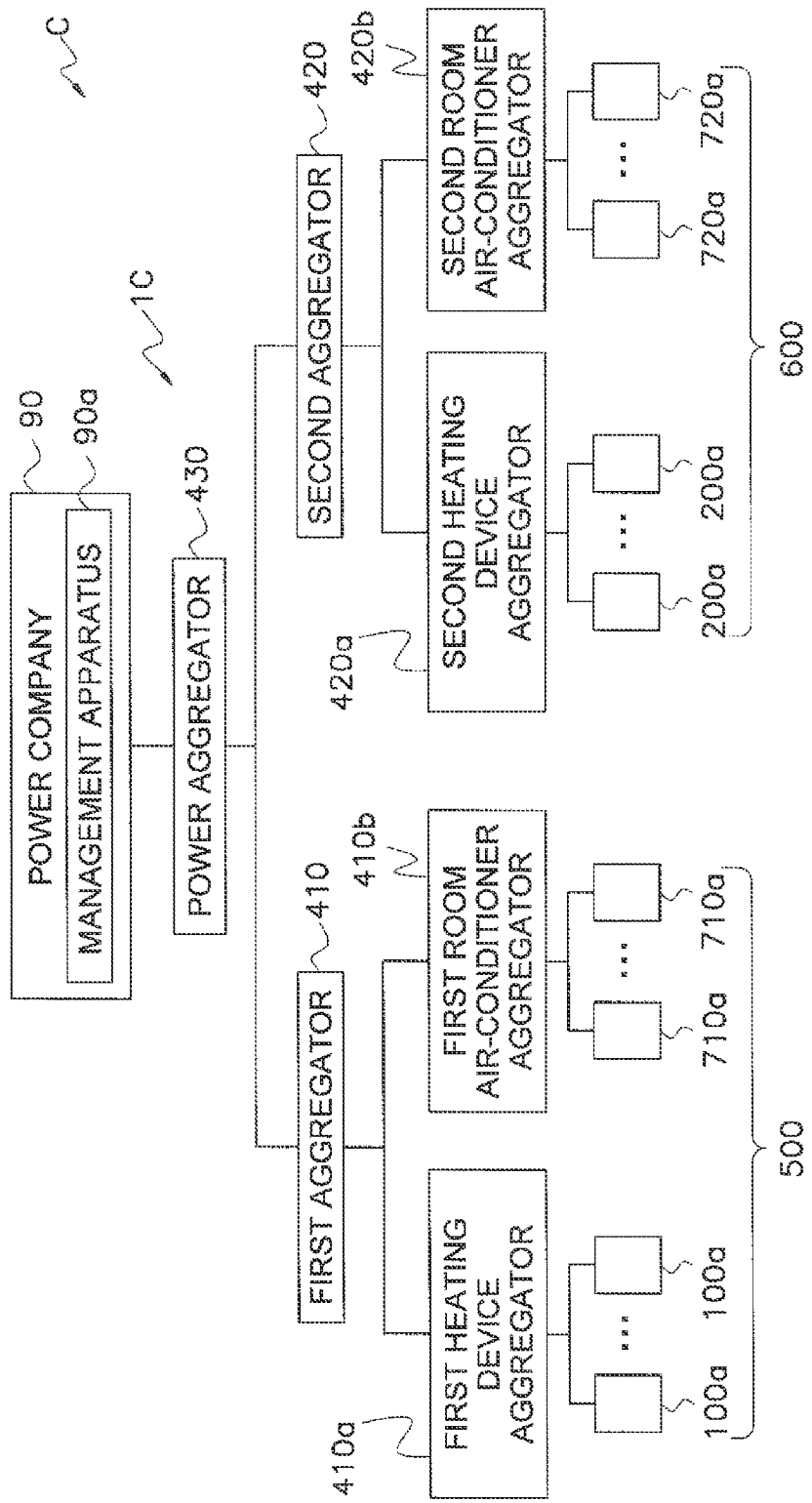
FIG. 13 is a schematic diagram of a power network including the demand-response system according to the third embodiment of the present invention.

FIG. 13 is a schematic diagram of a power network C including the demand-response system 1C. The power network C includes a power company 90, the demand-response system 1C, and first and second device groups 500, 600. The demand-response system 1C is provided with a power aggregator 430, first and second aggregators 410, 420, first and second heating device aggregators 410*a*, 420*a*, and first and second room air-conditioner aggregators 410*b*, 420*b*.

The demand-response system 1C differs from that of the first embodiment in that the first device group 500 includes devices of a plurality of types (two types of devices, first heating devices 100*a* and first room air-conditioners 710*a*, are included in this embodiment). The second device group 600 similarly includes devices of a plurality of types (two types of devices, second heating devices 200*a* and second room air-conditioners 720*a*, are included in this embodiment). The first and second heating devices 100*a*, 200*a* are similar to those described in the first embodiment, and the first and second room air-conditioners 710*a*, 720*a* are similar to those described in the second embodiment.

In the present embodiment, the first heating devices 100*a* and the first room air-conditioners 710*a* are manufactured by manufacturer Z1. The second heating devices 200*a* and the second room air-conditioners 720*a* are manufactured by manufacturer Z2.

The demand-response system 1C shares several features with the demand-response system 1A of the first embodiment, and thus the features that differ therefrom will mainly be described below.

In the power network C, the power company 90 supplies power to the first and second device groups 500, 600 owned by power consumers. The power company 90 supplies power to devices (not shown) that are owned by the power consumers and are not included in the first and second device groups 500, 600.

The power company 90 has a management apparatus 90*a*. The management apparatus 90*a* sends a power-usage adjustment request to the power aggregator 430 as needed so that the power supplied by the power company 90 and the power used by the power consumers are balances. The management apparatus 90*a* is similar to that in the demand-response system 1A of the first embodiment, and is thus not described again here.

The power aggregator 430 is one example of a first upper-tier aggregator apparatus. The power aggregator 430 is connected via communication lines to the management apparatus 90*a* of the power company 90 on the upper-tier side (see FIG. 13). The power aggregator 430 is also connected via communication lines to first and second aggregators 410, 420 on the lower-tier side (FIG. 13).

Upon receiving the first power adjustment request from the management apparatus 90*a*, the power aggregator 430, in order to comply with the request, sends a power-usage adjustment request to the first and second aggregators 410, 420. The power-usage adjustment request sent by the power aggregator 430 to the first and second aggregators 410, 420 will be referred as the second power adjustment request in the following. The second power adjustment request is one example of an energy adjustment request.

The first aggregator 410 is one example of a first aggregator apparatus. The first aggregator 410 is connected to the power aggregator 430 on the upper-tier side via communication lines (FIG. 13). The first aggregator 410 is connected to the first heating device aggregator 410*a* and the first room air-conditioner aggregator 410*b* on the lower-tier side via communication lines (FIG. 13).

The first aggregator 410 performs demand-response-related control of the first device group 500 in accordance with the second power adjustment request from the power aggregator 430. As stated above, the first room air-conditioners 710*a* and the first heating devices 100*a* included in the first device group 500 are manufactured by manufacturer Z1. The first aggregator 410 is used for devices manufactured by manufacturer Z1. The first aggregator 410 performs demand-response-related control of the first device group 500 using a first dedicated command for the first device group 500 being unique to manufacturer Z1.

The first room air-conditioners 710*a* and the first heating devices 100*a* included in the first device group 500 differ in terms of their specifications and characteristics. In the present embodiment, the first heating device aggregator 410*a* for supervising the demand-response-related control of the first heating devices 100*a* and the first room air-conditioner aggregator 410*b* for supervising the demand-response-related control of the first room air-conditioners 710*a* are provided on a lower tier relative to the first aggregator 410 so that the control is performed as suited to each of the devices (the first room air-conditioners 710*a* and the first heating devices 100*a*).

Communication between the first aggregator 410, and the first heating device aggregator 410*a* and the first room air-conditioner aggregator 410*b*, communication between the first heating device aggregator 410*a* and the first heating devices 100*a*, and communication between the first room air-conditioner aggregator 410*b* and the first room air-conditioners 710*a* are performed using a communication protocol for the first device group 500 being unique to manufacturer Z1. However, this arrangement is not provided by way of limitation; a generic communication protocol may be used as the communication protocol for the first device group 500.

The second aggregator 420 is one example of a second aggregator apparatus. The second aggregator 420 is connected to the power aggregator 430 on the upper-tier side via communication lines (FIG. 13). The second aggregator 420 is connected to the second heating device aggregator 420*a* and the second room air-conditioner aggregator 420b on the lower-tier side via communication lines (FIG. 13).

The second aggregator 420 performs demand-response-related control of the second device group 600 in accordance with the second power adjustment request from the power aggregator 430. As stated above, the second room air-conditioners 720a and the second heating devices 200a included in the second device group 600 are manufactured by manufacturer Z2. The second aggregator 420 is used for devices manufactured by manufacturer Z2. The second aggregator 420 performs demand-response-related control of the second device group 600 using a second dedicated command for the second device group 600 being unique to manufacturer Z2.

The second room air-conditioners 720a and the second heating devices 200a included in the second device group 600 differ in terms of their specifications and characteristics. In the present embodiment, the second heating device aggregator 420a for supervising the demand-response-related control of the second heating devices 200a and the second room air-conditioner aggregator 420b for supervising the demand-response-related control of the second room air-conditioners 720a are provided on a lower tier relative to the second aggregator 420 so that the control is performed as suited to each of the devices (the second room air-conditioners 720a and the second heating devices 200a).

Communication between the second aggregator 420, and the second heating device aggregator 420a and the second room air-conditioner aggregator 420b, communication between the second heating device aggregator 420a and the second heating devices 200a, and communication between the second room air-conditioner aggregator 420b and the second room air-conditioners 720a are performed using a communication protocol for the second device group 600 being unique to manufacturer Z2. However, this arrangement is not provided by way of limitation; a generic communications protocol may be used as the communication protocol for the second device group 600.

(2) Detailed Configuration

The power aggregator 430, first aggregator 410, and first eating device aggregator 410a are described below.

(2-1) Power Aggregator

The power aggregator 430 is one example of a first upper-tier aggregator apparatus for sending a second power adjustment request (an energy adjustment request) to the first and second aggregators 410, 420.

The power aggregator 430 is connected to the management apparatus 90a of power company 90 on the upper-tier side via communication lines. The power aggregator 430 is connected to the first and second aggregators 410, 420 on the lower-tier side via communication lines.

The power aggregator 430 receives a first power adjustment request from the management apparatus 90a together with the power-usage adjustment request period and the target adjustment amount of power usage. The target adjustment amount of power usage received from the management apparatus 90a is distributed to the first aggregator 410 and the second aggregator 420 based on, e.g., information on the current power usage of the first device group 500 and the current power usage of the second device group 600. The target adjustment amount of power usage distributed to the first aggregator 410 and the second aggregator 420 is sent to the first aggregator 410 and the second aggregator 420 together with the second power adjustment request as a first request amount and a second request amount, respectively.

The power aggregator 430 is similar to the power aggregator 30 described in the first embodiment, and is accordingly not described here in detail.

(2-2) First Aggregator

The first aggregator 410 is connected to the power aggregator 430 on the upper-tier side via communication lines. The first aggregator 410 is connected to the first heating device aggregator 410a and the first room air-conditioner aggregator 410b on the lower-tier side via communication lines. The first aggregator 410 performs demand-response-related control of the first device group 500. As described above, the first device group 500 includes the first heating devices 100a and the first room air-conditioners 710a manufactured by manufacturer Z1. The first heating devices 100a and the first room air-conditioners 710a are both heat pump devices, and one example of the first heat pump devices.

The first aggregator 410 performs demand-response-related control of the first device group 500 installed in a plurality of residences, using a first dedicated command for the first device group 500 (a first dedicated command unique to manufacturer Z1), in accordance with the second power adjustment request from the power aggregator 430. A detailed description follows.

The first aggregator 410 receives the second power adjustment request from the power aggregator 430 together with the power-usage adjustment request period and the first request amount. The first aggregator 410, for example, distributes the first request amount received from the power aggregator 430 to the devices 100a, 710a in proportion to the current power usage of the devices 100a, 710a. However, the method of distribution is not limited thereto. The first aggregator 410 performs demand-response-related control of the first device group 500 based on the results of distributing the first request amount to the devices 100a, 710a. More specifically, the first aggregator 410 sends the results of distributing the first request amount to the respective first heating devices 100a to the first heating device aggregator 410a and sends the results of distributing the first request amount to the respective first room air-conditioners 710a to the first room air-conditioner aggregator 410b, using the first dedicated command for the first device group 500 (the command being unique to manufacturer Z1).

In the second aggregator 420, the second dedicated command for the second device group 600 (the command being unique to manufacturer Z2), which is different from the first dedicated command for the first device group 500, is used as the command directed to the second heating device aggregator 420a and the second room air-conditioner aggregator 420b. Except for that, the second aggregator 420 is similar to the first aggregator 410, for which reason the second aggregator 420 will not be described here.

The fact that the second aggregator 420 and the first aggregator 410 are similar means that, the second request amount received by the second aggregator 420 is distributed to the devices 200a, 720a of the second device group 600 by the second aggregator 420, but does not necessarily mean that the second aggregator 420 and the first aggregator 410 are identical. For example, the method for distributing the second request amount to the devices 200a, 720a as employed in the second aggregator 420 may differ from the method for distributing the first request amount to the devices 100a, 710a as employed in the first aggregator 410.

(2-3) First Heating Device Aggregator

The first heating device aggregator 410a is connected to the first aggregator 410 on upper-tier side via communication lines. In addition, the first heating device aggregator 410a is connected to the first heating device 100a on the lower-tier side via communication lines.

The first heating device aggregator 410a determines the control content of the first heating devices 100a based on the results of distributing the first request amount to the respective first heating devices 100a received from the first aggregator 410. The first heating device aggregator 410a also generates control instructions for the first heating devices 100a to cause the first heating devices 100a to implement the determined control content. The specific example of the control content of the first heating device 100a as determined by the first heating device aggregator 410a is similar to the control content of the first heating device 100a as determined by the first aggregator 10 in the first embodiment, and is accordingly not described here. The generated control instruction is sent to the first heating devices 100a.

The second heating device aggregator 420a is similar apparatus as the first heating device aggregator 410a, and accordingly shall not be described here. The fact that the second heating device aggregator 420a and the first heating device aggregator 410a are similar means that, the second heating device aggregator 420a determines the control content of the second heating devices 200a based on the results of distributing the second request amount to the second heating devices 200a and generates control instructions to cause the second heating device 200a to implement that control content, but the second heating device aggregator 420a and the first heating device aggregator 410a are not necessarily identical. For example, the control content of the second heating device 200a determined b the second heating device aggregator 420a and the control content of the first heating device 100a determined by the first heating device aggregator 410a may be different.

The first room air-conditioner aggregator 410b and the second room air-conditioner aggregator 420b are similar to the first heating device aggregator 410a except that the fact that the objects for which the control content is determined are the room air-conditioners 710a, 720a, and accordingly are described here.

(3) Power Usage Adjustment Control by Demand-Response System

The adjustment control of power usage of the first and second device groups 500, 600 performed by the demand-response system 1C when the first power adjustment request has been sent to the power aggregator 430 from the management apparatus 90a will be described with reference to the flowchart shown in FIG. 14.

In step S201, the power aggregator 430 receives the first power adjustment request, the power-usage adjustment request period, and the target adjustment amount of power usage sent by the management apparatus 90a. The sequence then advances to step S202.

In step S202, the power aggregator 430 distributes the target adjustment amount of power usage received from the management apparatus 90a to the first aggregator 410 and the second aggregator 420, and calculates the distributed amounts as the first request amount and the second request amount, respectively. Specifically, the power aggregator 430 distributes the target adjustment amount to the first aggregator 410 and the second aggregator 420 at the same ratio as the current power usage of the first device group 500 and the second device group 600, and calculates the distributed amounts as the first request amount and the second request amount. After the first request amount and the second request amount have been calculated, the sequence advances to Step S203.

In Step S203, the power aggregator 430 sends the calculated first request amount and the power-usage adjustment request period to the first aggregator 410 together with the second power adjustment request. In addition, the power aggregator 430 sends the calculated second request amount and the power-usage adjustment request period to the second aggregator 420 together with the second power adjustment request. The power aggregator 430 sends the second power adjustment request, etc. to the first and second aggregators 410, 420 using a command that is common to the first and second aggregators 410, 420.

The operations of the second aggregator 420, the second heating device aggregator 420a, the second room air-conditioner aggregator 420b, the second heating devices 200a, and the second room air-conditioners 720a performed after the second aggregator 420 has received the second power adjustment request are similar to the operations of the first aggregator 410, the first heating device aggregator 410a, the first room air-conditioner aggregator 410b, the first heating devices 100a, and the first room air-conditioners 710a performed after the first aggregator 410 has received the second power adjustment request. Therefore, no description is given here for the operations of the second aggregator 420 or apparatuses or devices thereunder (the second heating device aggregator 420a, the second room air-conditioner aggregator 420b, the second heating device 200a, and the second room air-conditioners 720a).

In step S204, the first aggregator 410 receives, the second power adjustment request, the power-usage adjustment request period, and the first request amount sent by the power aggregator 430. The sequence then advances to step S205.

In Step S205, the first aggregator 410 distributes the first request amount received form the power aggregator 430 to the devices 100a, 710a of the first device group 500. Specifically, for example, the first aggregator 410 distributes the first request amount to the respective devices 100a, 710a proportionally to the current power usage of the respective devices 100a, 710a. The sequence then advances to step S206.

In Step S206, the first aggregator 410 sends the results of distributing the first request amount to the first heating devices 100a to the first heating device aggregator 410a, and sends the results of distributing the first request amount to the first room air-conditioners 710a to the first room air-conditioner aggregator 410. The first aggregator 410 sends a control instruction to the first heating device aggregator 410a and the first room air-conditioner aggregator 410b using the first dedicated command for the first device group 500. The flow then proceeds to S207 and S227.

Figure 14:
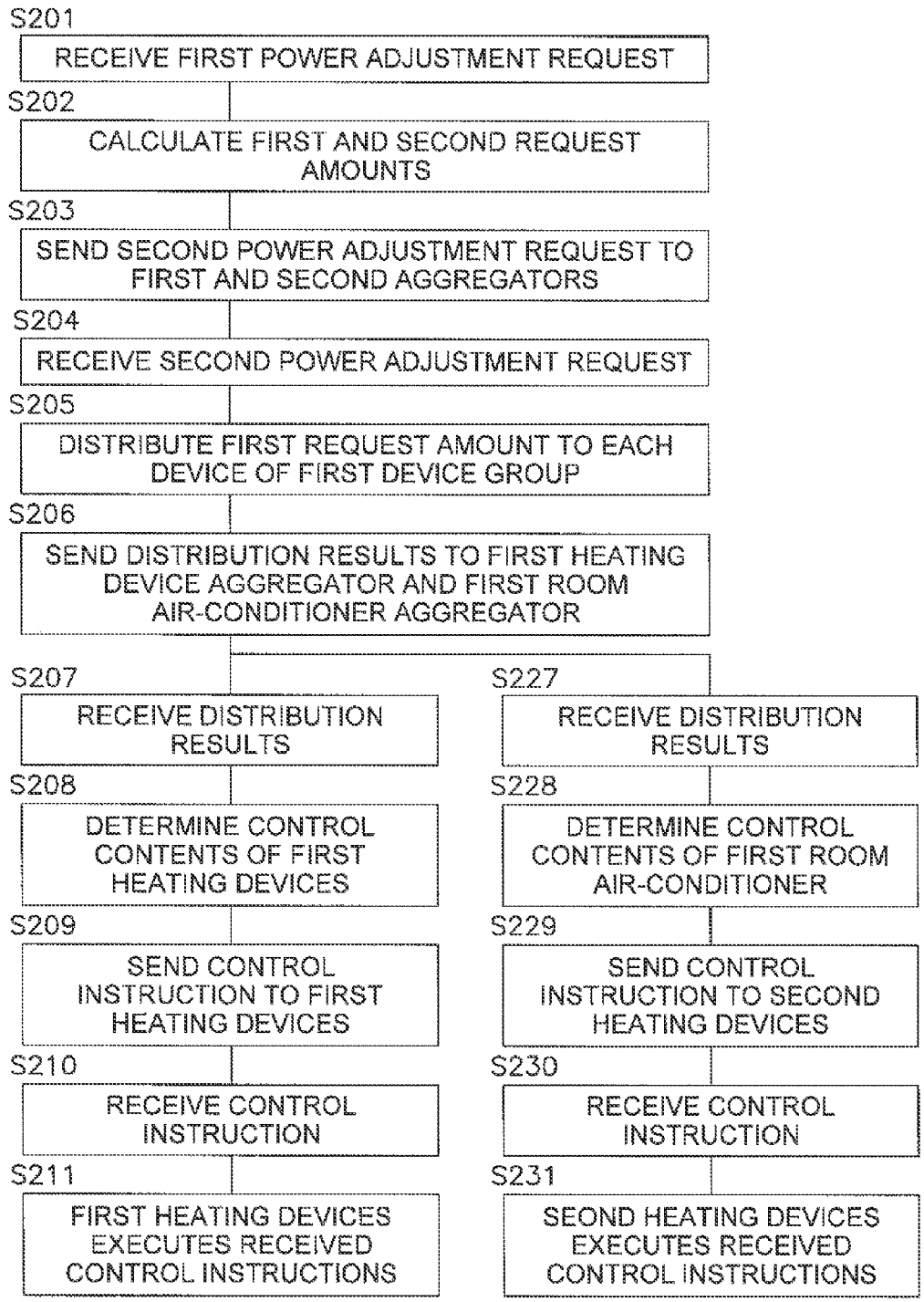
FIG. 14 is a flowchart for describing power consumption adjustment control in the demand-response system of FIG. 13.

Steps S207 through S211 shown in FIG. 14 are executed by the first heating device aggregator 410a and the first heating devices 100a. Steps S227 through S231 are executed by the first room air-conditioner aggregator 410b and the first room air-conditioners 710a. Steps S207 through S211 and Steps S227 through S231 are executed in parallel. Other than the fact that the apparatuses and devices performing the operations are different, Steps S227 through S231 are similar to Steps S207 through S211, and are accordingly not described here.

In Step S207, the first heating device aggregator 410a receives the results of distributing the first request amount to the first heating device 100a sent by the first aggregator 410. The sequence then advances to step S208.

In Step S208, the first heating device aggregator 410a determines the control contents to enable the respective first heating devices 100a to adjust power usage by distribution amount distributed to the respective first heating devices 100*a*. The control content of the first heating device 100*a* as determined by the first heating device aggregator 410*a* is similar to the control content of the first heating device 100*a* as determined by the first aggregator 10 in the first embodiment, and is accordingly not described here. Upon determining the control content of the first heating devices 100*a*, the first heating device aggregator 410*a* generates control instructions for causing the first heating devices 100*a* to execute that control content. The sequence then advances to step S209.

In Step S209, the control instruction generated by the first heating device aggregator 410*a* is sent to the first heating devices 100*a*. The first heating device aggregator 410*a* sends the control instructions to the first heating devices 100*a* using the first dedicated command for the first device group 500. The sequence then advances to step S210.

In Step S210 each of the first heating devices 100*a* receives the control instruction sent from the first heating device aggregator 410*a*. The sequence then advances to step S211.

In Step S211, the first heating devices 100*a* execute the received control instruction (4) Characteristics The demand-response system 1C of the third embodiment has the same features as the demand-response system 1A of the first embodiment.

(5) Modifications

Modifications of the demand-response system 1C of the third embodiment are described below. The modifications may be used in a plurality of combinations as long as no conflict is encountered therebetween. The demand-response system 1C of the third embodiment may have the features of the modifications of the first embodiment and the second embodiment as long as no conflict is encountered.

(5-1) Modification 3A

In the above embodiment, the first aggregator 410, the first heating device aggregator 410*a* and the first room air-conditioner aggregator 410*b* are mutually independent apparatuses, but such an arrangement is not provided by way of limitation. For example, the function of the first heating device aggregator 410*a* and the first room air-conditioner aggregator 410*b* may be executed by a function unit of the first aggregator 410.

(5-2) Modification 3B

In the above embodiment, the demand-response system 1C includes the first heating device aggregator 410*a* and the first room air-conditioner aggregator 410*b*, but such an arrangement is not provided by way of limitation. For example, even if the first device group 500 includes a plurality of types of devices, the first aggregator 410 can determine the control content based on the results of distributing the first request amount in a case when the control content can be determined irrespective of the type of device.

(5-3) Modification 3C

In the above embodiment, the devices included in the first device group 500 and the second device group 600 are all heat pumps, but such an arrangement is not provided by way of limitation. Some of the devices may be devices other than heat pumps. Moreover, the demand-response system 1C may include a device aggregator for performing demand-response-related control of a device group that does not include a heat pump device (e.g., a device group solely comprising electric automobiles).

(5-4) Modification 3D

In the above embodiment, the types of devices included in the first device group 500 and the second device group 600 are identical, but such an arrangement is not provided by way of limitation. For example, the first device group may include a heating device, a room air-conditioner, and a heat-pump water heater manufactured by manufacturer Z1, while the second device group can include a room air-conditioner, a package air-conditioner, and a refrigeration device manufactured by manufacturer Z2.

INDUSTRIAL APPLICABILITY

Using the demand-response system of the present invention, high-accuracy demand-response can be realized without developing a shared command for controlling all devices, and a balance between power supply and demand can be easily maintained.

What is claim is:

1. A demand-respond system comprising:
    a first aggregator apparatus configured to perform demand-response-related control of a first group of devices including a first heat pump device in which control specifications of the devices are standardized;
    a second aggregator apparatus configured to perform demand-response-related control of a second group of devices in which control specifications of the devices are standardized, the second group of devices being different from the first group of devices, and
    a first upper-tier aggregator apparatus configured to distribute a target adjustment amount of power usage to the first aggregator apparatus and the second aggregator apparatus as a first request amount and a second request amount, respectively, and send an energy adjustment request to the first aggregator apparatus and the second aggregator apparatus which requests the first aggregator apparatus and the second aggregator apparatus to adjust the amount of power usage by the first request amount and the second request amount, respectively, using a command common to the first aggregator apparatus and the second aggregator apparatus,
    the control specifications of the first group of devices being different from the control specifications of the second group of devices,
    the first aggregator apparatus being configured to distribute the first request amount to individual devices in the first group of devices, determine the control content for each device of the first of devices so that each device adjusts the amount of power usage by the distributed amount, and perform demand-response-related control of the first group of devices installed in a plurality of buildings using a first dedicated command for the first group of devices in accordance with the energy adjustment request,
    the second aggregator apparatus being configured to distribute the second request amount to individual devices in the second group of devices, determine the control content for each device of the second group of devices so that each device adjusts the amount of power usage by the distributed amount, and perform demand-response-related control of the second group of devices installed in a plurality of buildings using a second dedicated command for the second group of devices in accordance with the energy adjustment request, and
    the second dedicated command being different from the first dedicated command.

2. The demand-response system of claim 1, wherein the demand-response-related control of the first group of devices includes at least one of control of storing heat in a heat reservoir in accordance with the energy adjustment request, and control of releasing heat from the heat reservoir in accordance with the energy adjustment request.

3. The demand-response system of claim 2, wherein the demand-response-related control of the first group of devices includes at least one of control of reducing a power usage of the first heat pump device, control of increasing the power usage of the first heat pump device, control of stopping the first heat pump device, and control of starting the first heat pump device.

4. The demand-response system of claim 1 further comprising a second upper-tier aggregator apparatus configured to send the target adjustment amount to the first upper-tier aggregator apparatus, the first group of devices including solely a plurality of the first heat pump devices, the second group of devices including solely a plurality of second heat pump devices, and the first heat pump devices and the second heat pump devices being a same type of heat pump device.

5. The demand-response system of claim 1, wherein the second group of devices includes energy storying devices.

6. The demand-respond system of claim 5, wherein the second group of devices includes devices having a storage battery.

7. The demand-response system of claim 2, wherein the second group of devices includes energy storying devices.

8. The demand-response system of claim 3, wherein the second group of devices includes energy storying devices.

9. The demand-response system of claim 1, wherein the first upper-tier aggregator apparatus is configured to distribute the target adjustment amount of power usage to the first aggregator apparatus and the second aggregator apparatus as the first request amount and the second request amount, respectively, based on the current power usage of the first group of devices and the current power usage of the second group of devices, the first aggregator apparatus is configured to distribute the first request amount to individual devices in the first group of devices based on the current power usage of each device in the first group of devices, and the second aggregator apparatus is configured to distribute the second request amount to individual devices in the second group of devices based on the current power usage of each device in the second group of devices.

10. The demand-response system of claim 1, wherein the first group of devices includes solely a plurality of the first heat pump devices, the second group of devices includes solely a plurality of second heat pump devices, the second heat pump devices being different from the first heat pump devices, the first heat pump devices and the second heat pump devices are the same type of heat pump devices, the first aggregator apparatus is configured to distribute the first request amount to individual devices in the first group of devices, determine at least the control content of a compressor of each of the first heat pump devices of the first group of devices so that each of the device adjusts the amount of power usage by the distributed amount, and perform demand-response-related control of the first group of devices installed in the plurality of buildings using the first dedicated command for the first group of devices in accordance with the energy adjustment request, and the second aggregator apparatus is configured to distribute the second request amount to individual devices in the second group of devices, determine at least the control content of a compressor of each of the second heat pump devices of the second group of devices so that each of the device adjusts the amount of power usage by the distributed amount, and perform demand-response-related control of the second group of devices installed in the plurality of buildings using the second dedicated command for the second group of devices in accordance with the energy adjustment request.

* * * * *